United States Patent
Brusberg et al.

(10) Patent No.: US 10,585,242 B1
(45) Date of Patent: Mar. 10, 2020

(54) CHANNEL WAVEGUIDES WITH BEND COMPENSATION FOR LOW-LOSS OPTICAL TRANSMISSION

(71) Applicant: CORNING RESEARCH & DEVELOPMENT CORPORATION, Corning, NY (US)

(72) Inventors: Lars Martin Otfried Brusberg, Corning, NY (US); Sergey Anatol'evich Kuchinsky, St. Petersburg (RU); Rostislav Vatchev Roussev, Painted Post, NY (US); Aramais Robert Zakharian, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/145,977

(22) Filed: Sep. 28, 2018

(51) Int. Cl.
*G02B 6/125* (2006.01)
*G02B 6/12* (2006.01)

(52) U.S. Cl.
CPC .... *G02B 6/125* (2013.01); *G02B 2006/12038* (2013.01); *G02B 2006/12183* (2013.01)

(58) Field of Classification Search
CPC .................. G02B 6/1345; G02B 2006/12183
See application file for complete search history.

(56) References Cited

U.S. PATENT DOCUMENTS

| 3,873,408 A | 3/1975 | Hensler |
| 3,880,630 A | 4/1975 | Izawa |
| 4,765,702 A | 8/1988 | Dohan et al. |
| 5,007,948 A | 4/1991 | Araujo |
| 5,018,811 A * | 5/1991 | Haavisto ................. G02B 6/125 264/1.7 |
| 5,035,734 A | 7/1991 | Honkanen et al. |
| 5,160,523 A | 11/1992 | Honkanen et al. |

(Continued)

FOREIGN PATENT DOCUMENTS

| JP | 04086607 A | 3/1992 |
| JP | 2006201298 A | 8/2006 |

(Continued)

OTHER PUBLICATIONS

Marcuse; "Influence of Curvature on the Losses of Doubly CLAD Fibers". Applied Optics / vol. 21, No. 23 / Dec. 1, 1982.

(Continued)

*Primary Examiner* — Omar R Rojas
(74) *Attorney, Agent, or Firm* — Michael E. Carroll, Jr.

(57) ABSTRACT

The channel waveguides disclosed herein have bend compensation in the form of at least one compensated bend section. The channel waveguides are formed in a glass-based substrate having a glass-based matrix. The channel waveguide has an waveguide IOX region with a straight section and a bend section. The waveguide IOX region at the bend section is superimposed with a quasi-linear modifying IOX region to form a compensated bend IOX region that defines the compensated bend section. The compensated bend section has a reduced amount of optical loss as compared to if the compensated bend section had a refractive index profile that was the same as the straight section. Methods of forming the compensated bend sections for the channel waveguides are also disclosed.

20 Claims, 14 Drawing Sheets

(56) References Cited

U.S. PATENT DOCUMENTS

| | | | |
|---|---|---|---|
| 5,703,980 A | | 12/1997 | MacElwee et al. |
| 5,790,729 A | * | 8/1998 | Pologe .................. G02B 6/125 385/20 |
| 6,002,515 A | | 12/1999 | Mizuuchi et al. |
| 6,153,546 A | | 11/2000 | Saitoh et al. |
| 6,289,027 B1 | | 9/2001 | Lawrence et al. |
| 6,611,372 B1 | | 8/2003 | Peyghambarian et al. |
| 6,768,852 B2 | | 7/2004 | Zhang |
| 6,946,416 B2 | | 9/2005 | Maxon et al. |
| 7,326,500 B1 | | 2/2008 | Glebov et al. |
| 8,230,702 B2 | | 7/2012 | Xu et al. |
| 8,737,777 B2 | * | 5/2014 | Pitwon .................. G02B 6/125 385/32 |
| 9,268,096 B1 | | 2/2016 | Krasulick et al. |
| 9,563,018 B2 | | 2/2017 | Budd |
| 2003/0081902 A1 | | 5/2003 | Blauvelt et al. |
| 2003/0095771 A1 | | 5/2003 | Kim |
| 2003/0113054 A1 | | 6/2003 | Furuyama |
| 2003/0121283 A1 | | 7/2003 | Yu |
| 2003/0144125 A1 | | 7/2003 | Anma et al. |
| 2004/0206129 A1 | | 10/2004 | Dabby |
| 2006/0260364 A1 | | 11/2006 | Pun et al. |
| 2008/0268201 A1 | | 10/2008 | Fiacco et al. |
| 2009/0324163 A1 | | 12/2009 | Dougherty et al. |
| 2011/0236288 A1 | | 9/2011 | Panz et al. |
| 2011/0244238 A1 | | 10/2011 | Panz et al. |
| 2013/0170802 A1 | | 7/2013 | Pitwon |
| 2014/0079620 A1 | | 3/2014 | Panz et al. |
| 2014/0092377 A1 | | 4/2014 | Liu et al. |
| 2014/0152914 A1 | | 6/2014 | King |
| 2014/0376868 A1 | | 12/2014 | Ritter et al. |
| 2015/0198757 A1 | | 7/2015 | Comstock, II et al. |
| 2015/0368146 A1 | | 12/2015 | Ellison et al. |
| 2016/0018949 A1 | | 1/2016 | Lambricht et al. |
| 2016/0131837 A1 | | 5/2016 | Mahgerefteh et al. |
| 2017/0205583 A1 | | 7/2017 | Bennett et al. |
| 2018/0067273 A1 | | 3/2018 | Geng et al. |

FOREIGN PATENT DOCUMENTS

| | | |
|---|---|---|
| KR | 100439900 B1 | 7/2004 |
| WO | 2000045197 A2 | 8/2000 |
| WO | 200137008 A2 | 5/2001 |
| WO | 03062863 A2 | 7/2003 |
| WO | 2016055006 A1 | 4/2016 |
| WO | 2017009468 A1 | 1/2017 |

OTHER PUBLICATIONS

Almeida et al; "Waveguides and Nonlinear Index of Refraction of Borate Glass Doped With Transistion Metals" ; Optical Materials 42 (2015) pp. 522-525.

Auxier et al; "Silver and Potassium Ion-Exchanged Waveguides in Glasses Doped With PbS Semiconductor Quantum Dots" ; J. Opt. Soc. Am. B, vol. 23, No. 6, (2006) pp. 1037-1045.

Betschon et al; "Design Principles and Realization of Electro-Optical Circuit Boards," SPIE 8630 (2013); pp. 86300U-1-86300U-12.

Brusberg et al; "High Performance Ion-Exvhanged Integrated Waveguides in Thin Glass for Board-Level Multimode; Optical Interconnects" ; Proc ECOC (2015); 3 Pages.

Furukawa et al; "Optical Damage Resistance and Crystal Quality of LiNbO3 Single Crystals With Various [Li]/[Nb] Ratios" ; Journal of Applied Physics, 72, (8); (1992) pp. 3250-3254.

Hao et al; "Single-Mode-Fiber-Matched Waveguide by Silver/Sodium Ion-Exchange and Field-Assisted Ion-Diffusion" ; Optoelectronics and Advanced Materials—Rapid Communications; vol. 3; No. 9; (2009) pp. 865-868.

Hayden et al; "Active Materials for Integrated Optic Applications" ; SPIE vol. 3847 (1999) pp. 186-196.

Ingenhoff et al; "Minimizing Losses in Silver Ion-Exchanged Waveguides Using a Double Ion Exchange Process" ; SPIE vol. 2401; (1995) 10 Pages.

Ishigure; "Gi-Core Polymer Optical Waveguide for Triggering the Migration of Optical Interconnects From Inter-Rack to PCBs" Proc. ECOC; Tu.3.5.5, (2014); 3 Pages.

Julich et al; "Determination of the Effective Refractive Index of Various Single Mode Fibers for Fibre Bragg Grating Sensor Applications" ; Sensor + Test Conference 2009, Opto 2009 Proceedings pp. 119-124 (2009.

Kash et al; "Optical Interconnects in Exascale Supercomputers" ; IEEE Photonics Society; (2010) pp. 483-484.

Keck et al; "Spectral Response of Low-Loss Optical Waveguides" ; Applied Optics; vol. 11, No. 7; (1972) pp. 1502-1506.

Madasamy et al; "Buried Ion-Exchanged Glass Waveguides: Burial-Depth Dependence on Waveguide Width" ; Optic's Letters; vol. 28, No. 13, (2003) pp. 1132-1134.

Mashayekhi et al. "Semiconductor device to optical fiber coupling using low-loss glasstaper waveguide" , Optical Engineering, Soc. of Photo-optical Instrumentation Engineers 36(12) 1997.

Matoba et al; "Nonuniform and Off-Axis Structures for Photorefractive Waveguides in Lithium Niobate" ; Opt. Eng. 35 (8); (1996) pp. 2175-2181.

Meany et al; "Towards Low-Loss Lightwave Circuits for Non-Classical Optics at 800 nm and 1550 nm" ; Applied Physics A, vol. 114; Issue 1; (2014) pp. 113-118.

Nakai et al; "Reduction of Absorption Loss Due to Iron Ions in Fluoride Glasses" ; Electronic Letters, vol. 21, No. 14 (1985) pp. 625-626.

Olivares et al; "Fe Ions in Proton-Exchanged LiNbO3 Waveguides" ; Appl. Phys. Lett. 61, (6); (1992) pp. 624-626.

Oven; "Tapered Waveguides Produced by Ion Exchange in Glass With a Nonuniform Electric Field" ; Journal of Lightwave Technology; vol. 24, No. 11, Nov. 2006; pp. 4337-4344.

Penty et al; "Low Loss Bends for On-Board Polymer Interconnects" PhoxTroT Symposium, Berlin (2014); 25 Pages.

Pitwon et al; "Pluggable Electro-Optical Circuit Board Interconnect Based on Embedded Graded-Index Planar Glass Waveguides" ; Journal of Lightwave Technology, vol. 33, No. 4, (2015); pp. 741-754.

Poulopoulos et al: "SiN-Assisted Flip-Chip Adiabatic Coupler Between SiPh and Glass OPCBS" ; Proceedings of SPIE; 9753; Mar. 2016; pp. 975310-1-975310-10.

Ramaswamy et al; "Ion-Exchanged Glass Waveguides: A Review"; Journal of Lightwave Technology, vol. 6., No. 6., Jun. 1988; pp. 934-1002.

Ramponi et al; "New Er-Doped Phosphate Glass for Ion-Exchange Active Waveguides: Accurate Determination of the Refractive Index" ; Optical Materials, 14 (2000) pp. 291-296.

Rehouma et al; "Glasses for Ion-Exchange Technology" ; International Journal of Communications; Issue 4, vol. 1, (2008); pp. 148-155.

Rogozinski, "Ion Exchange in Glass—The Changes of Glass Refraction" ; Intech, Chapter 7; (2012); pp. 155-190.

Sheridan et al; "Channel Waveguides in Ion-Exchanged Pyrex by Direct UV Writing" ; Optics Communications, 242 (2004) pp. 109-114.

Stewart et al; "Planar Optical Waveguides Formed by Silver-Ion Migration in Glass" ; IEEE Journal of Quantum Electronics, vol. QE-13, No. 4; (1977); pp. 192-200.

Tanio et al; "What Is the Most Transparent Polymer?" Polymer Journal, vol. 32, No. 1 pp. 43-50 (2000).

Tervonen et al; "Ion-Exchanged Glass Waveguides Technology: A Review"; Optical Engineering, 50 (7); (2011) pp. 071107-1-071107-15.

Tick; "Are Low-Loss Glass-Ceramic Optical Waveguides Possible?" ; Optics Letters; vol. 23, No. 24, (1998) pp. 1904-1905.

Wartak; "Simulation and Modeling: Computational Photonics Models Wavefuide-Based Optics," Laser Focus World, vol. 52, Issue 02, Feb. 2016.

Yliniemi et al; "Ion-Exchanged Glass Waveguides With Low Birefringence for a Broad Range of Waveguide Widths" ; Applied Optics; vol. 44, No. 16 (2005) pp. 3358-3363.

Zhang et al; "Modes Effective Refractive Index Difference Measurement in Few Mode Optical Fiber" ; Procedia Engineering; 140; (2016); pp. 77-84.

(56) References Cited

OTHER PUBLICATIONS

Zhang et al; "Photo-Written Three-Dimensional Optical Circuits in Iron Doped Lithium Niobate Crystals", Proc. of SPIE 6149, 2nd Internaitonal Symposium on Advanced Optical Manufacturing and Testing Technologies: Advanced Optical Manufacturing Technologies; (2006) 9 Pages.

International Search Report and Written Opinion of the European International Searching Authority; PCT/US2019/052413; dated Dec. 20, 2019; 11 Pgs.

* cited by examiner

US 10,585,242 B1

CHANNEL WAVEGUIDES WITH BEND COMPENSATION FOR LOW-LOSS OPTICAL TRANSMISSION

FIELD

The present disclosure generally relates to channel waveguides, and in particular to channel waveguides with bend compensation for low-loss optical transmission.

BACKGROUND

A photonic integrated device (also called a photonic integrated circuit (PIC)) combines optical or both optical and electronic components on a chip, in analogy to an electronic integrated circuit. A typical photonic integrated device carries and processes optical signals that travel in an array or network of waveguides, which can be optically coupled to optical fibers to carry the optical signal to and from the photonic integrated device.

Certain types of photonic integrated devices make use of planar lightwave circuits (PLCs) that support optical waveguides ("waveguides") used to communicate light between the device components. A relatively high level of integration can be realized by forming the waveguides in a thin glass-based substrate. The efficient routing of the waveguide between device components requires that at least some of the waveguides include one or more bends. Unfortunately, such bends introduce loss of the optical signal power. Since there are other sources of optical signal loss (e.g., at optical interconnections, attenuation per distance traveled in the optical fibers and waveguides, etc.), it is important to reduce optical signal loss wherever possible to avoid having to amplify the optical signal or to increase detection sensitivity.

SUMMARY

The disclosure is directed to methods for forming a channel waveguide in a glass-based substrate for optical signal transmission along with the channel waveguide. The method is directed to forming a channel waveguide comprising a compensated bend section and a straight-section comprising a straight-section refractive index cross-sectional profile. The method comprising forming in a glass-based substrate a quasi-linear modifying ion-exchanged (IOX) region using a first IOX process, forming in the glass-based substrate a waveguide bend IOX region using a second IOX process designed to impart a straight-section cross-sectional refractive index profile in the absence of the quasi-linear modifying IOX region, and wherein the quasi-linear modifying IOX region and the waveguide bend IOX region combine to form a compensated waveguide bend IOX region that defines in the channel waveguide the compensated bend section, which has an amount of optical loss less than if the modifying IOX region were absent.

The disclosure is also directed to a channel waveguide comprising a glass-based substrate comprising a glass-matrix and a surface, at least one ion-exchanged channel waveguide formed in the glass-based matrix and comprising a compensated bend section and a straight section, and wherein the straight section comprises a waveguide IOX region comprising a first refractive index profile and where the compensated bend section comprises the waveguide IOX region comprising a bend section and superimposed with a quasi-linear modifying IOX region that forms a compensated bend IOX region defining a compensated bend section with a reduced amount of optical loss as compared to if the compensated bend section consisted only of the waveguide IOX region.

Additional features and advantages will be set forth in the detailed description which follows, and, in part, will be apparent to those skilled in the art from that description or recognized by practicing the embodiments as described herein, including the detailed description which follows the claims, as well as the appended drawings.

It is to be understood that both the foregoing general description and the following detailed description are merely exemplary and are intended to provide an overview or framework to understanding the nature and character of the claims. The accompanying drawings are included to provide a further understanding, and are incorporated in and constitute a part of this specification. The drawings illustrate one or more embodiments, and together with the description explain the principles and operation of the various embodiments.

DETAILED DESCRIPTION

Figure 1A:
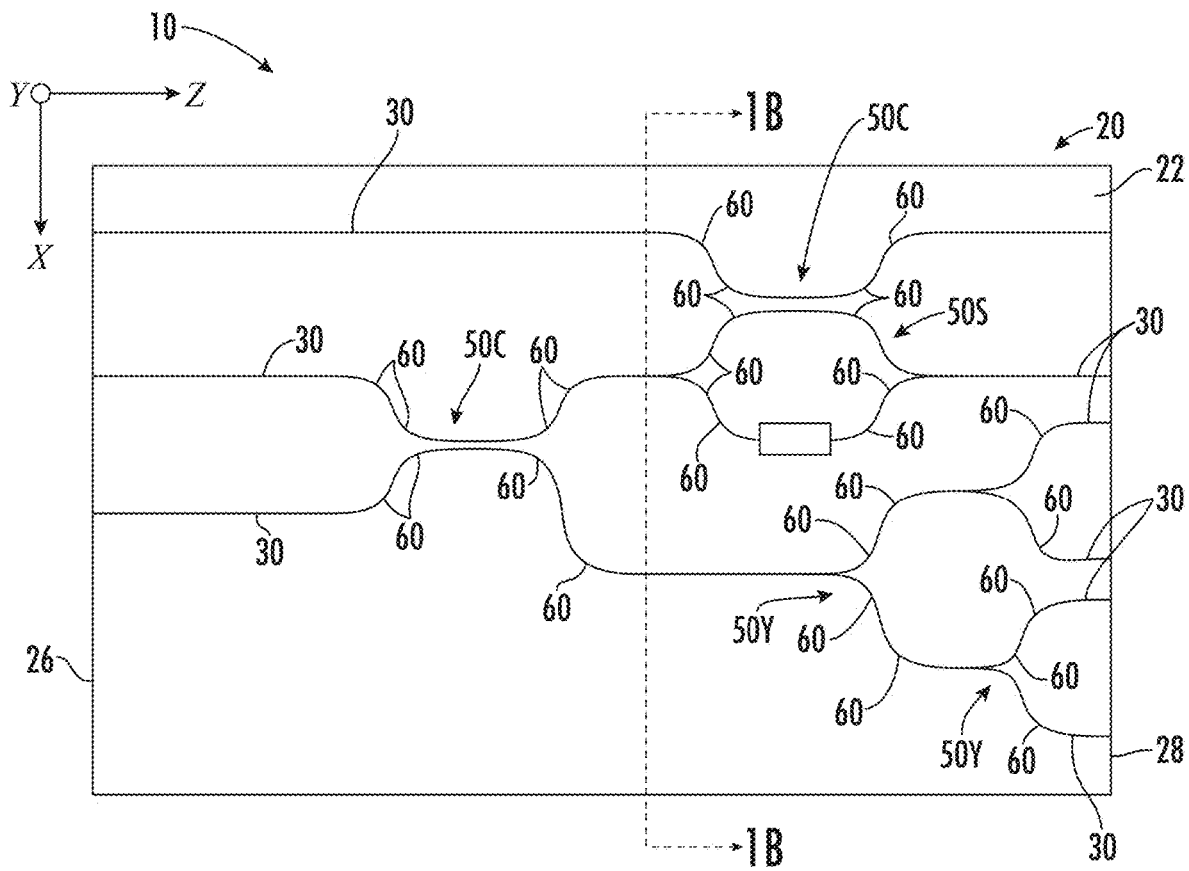
FIG. 1A is a top-down view of an example PLC formed in a glass-based substrate and that supports multiple channel waveguides each having at least one bend and showing the global Cartesian coordinates x, y, z.

Reference will now be made in detail to the present embodiments, examples of which are illustrated in the accompanying drawings. Whenever possible, the same reference numerals are used throughout the drawings to refer to the same or like parts.

Cartesian coordinates are used in some of the Figures for reference and are not intended to be limiting as to direction or orientation. The Cartesian coordinates (x,y,z) are general or global coordinates for the glass-based substrate. The Cartesian coordinates (x,y) are specific or local coordinates of the waveguide, where a given localized (x,y) plane is perpendicular to the centerline of the waveguide, which is curved in bend sections of the waveguide and straight in straight sections for the waveguide. Thus, the localized z-axis is co-linear with the waveguide centerline, and localized functions f(x,y), such as refractive index n(x,y), are for a given localized z-position along the centerline or localized z-axis. Unless otherwise stated, a given function f(x,y) is substantially constant along the localized z-axis in a given waveguide section, e.g., the bend section or the straight section.

For purposes of description herein, the terms "upper," "lower," "right," "left," "rear," "front," "vertical," "horizontal," "top," "bottom," "side," and derivatives thereof, shall relate to the disclosure as oriented with respect to the Cartesian coordinates in the corresponding Figure, unless stated otherwise. However, it is to be understood that the disclosure may assume various alternative orientations, except where expressly specified to the contrary.

The term "mode" is short for "guided mode" or "waveguide mode," which describes an allowed spatial distribution of light that propagates in a waveguide, whether it be an optical fiber or substrate-based waveguide. A mode can have a transverse electric (TE) polarization or a transverse magnetic (TM) polarization. A single mode waveguide supports only one TE and one TM mode. Modes are identified by a mode number m, where m=0 is the fundamental mode and m=1, 2, 3, . . . are higher-order modes.

The abbreviation "nm" stands for "nanometer," which is $1 \times 10^{-9}$ meter.

The abbreviation "µm" stands for "micron" or "micrometer," which is $1 \times 10^{-9}$ meter.

The term "quasi-linear" as used herein means either linear or nearly linear to an acceptable approximation. Thus, the quasi-linear refractive index term $\Delta n_q(x,y)$ introduced and discussed below can be equal to or fall within an acceptable range of the exact linear term $\Delta n(x) = Gx$, where G is a constant refractive index gradient.

It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise. Additionally, embodiments depicted in the Figures may not be to scale or may incorporate features of more than one embodiment.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "comprises" as used herein, such as in the phrase "A comprises B," is intended to include as a special case "A consists of B."

Example PLC

Figure 1B:
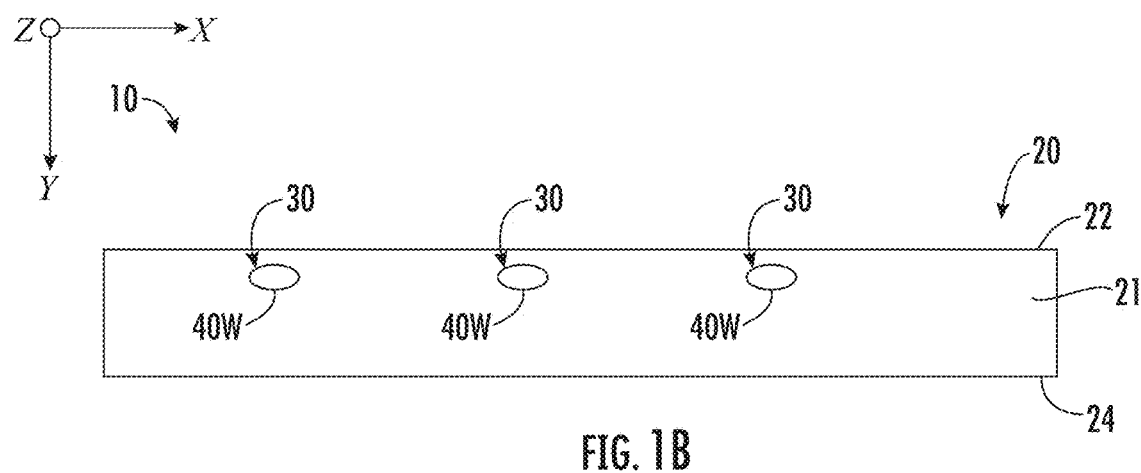
FIG. 1B is a x-y cross-sectional view of the PLC of FIG. 1A.

FIG. 1A is a top-down view and FIG. 1B is an x-y cross-sectional view of an example PLC 10 formed in a glass-based substrate 20. The glass-based substrate 20 has a glass-based matrix ("matrix") 21, a top surface 22, a bottom surface 24, a front end 26 and a back end 28. The glass-based substrate 20 supports multiple channel waveguides ("waveguides") 30 defined by respective waveguide IOX regions 40W (FIG. 1B).

The example PLC 10 shows by way of example a number of PLC devices 50 in the form of optical couplers 50C, a switches 50S, and Y-branches 50Y. The waveguides 30 for these and other types of devices typically have at least one bend section 60 so that a given waveguide can be properly routed with respect to another waveguide or to a PLC component or to another component (e.g., an optical fiber, a photodetector, an optical coupler, etc.) that can be placed next to the PLC.

Figure 2:
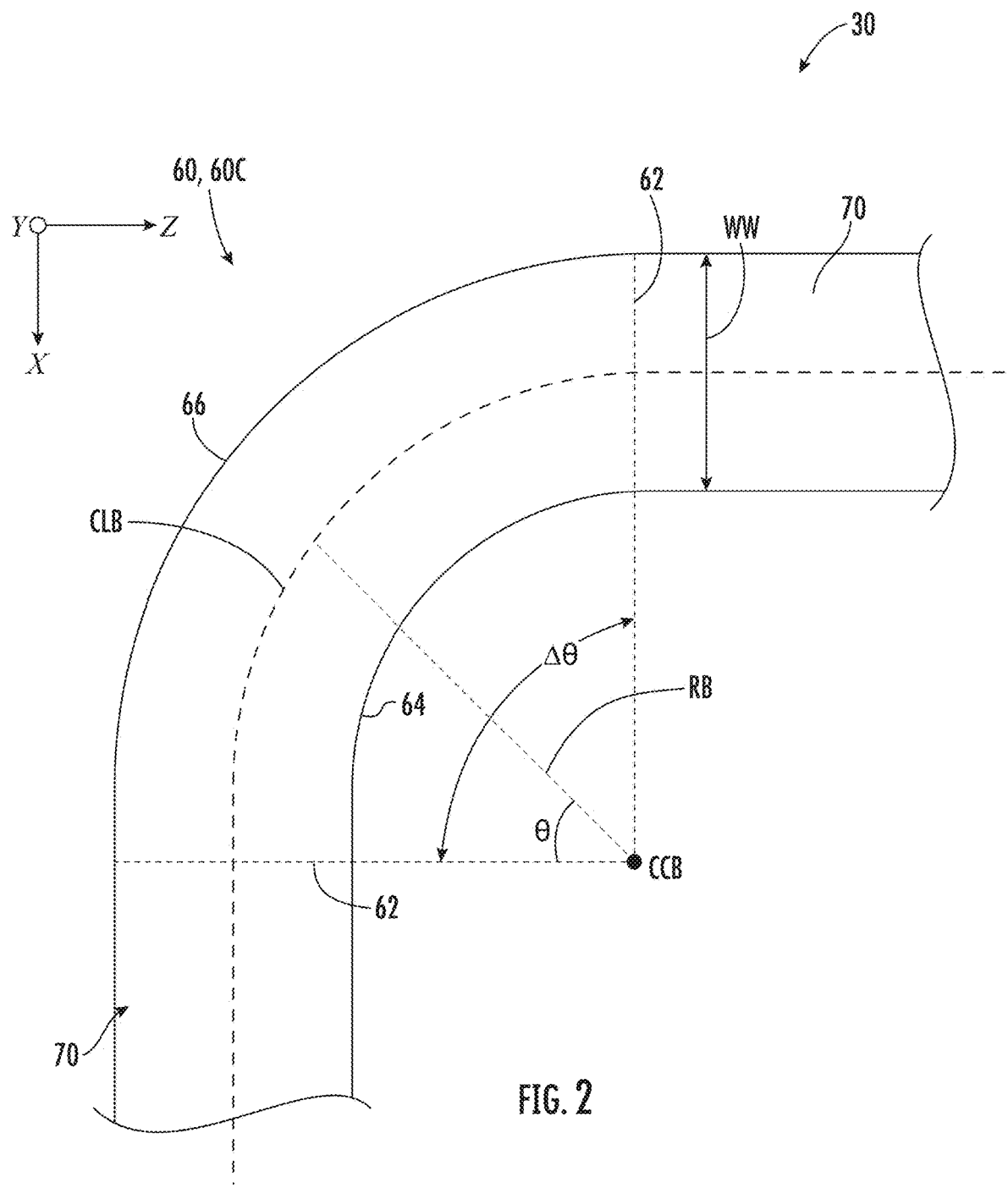
FIG. 2 is a close-up top-down view of an example section of a channel waveguide formed in the glass-based substrate, wherein the section includes bend section and two straight portions.

FIG. 2 is a close-up top-down view of an example bend section 60 of a waveguide 30 formed in the glass-based substrate 20. The bend section 60 resides between two straight sections 70 and includes opposite ends 62, and inside edge (or concave side) 64, an outside edge (or convex side) 66, a center line CL, a center of curvature CCB, and a radius of curvature ("bend radius") RB measured from the center of curvature to the center line. The bend section 60 has an angular coordinate θ and an associated angular extent Δθ. The example bend section 60 of FIG. 2 shows an angular extent Δθ=90° and has a "round" or circular curvature, i.e., a constant bend radius RB. The waveguide 30 can also include other types of bend sections 60, i.e., different angular directions and extents, a non-constant radius of curvature, etc., in which case the bend radius RB becomes a function of the angular coordinate θ. The bend section 60 can also be a compensated bend section 60C, as described below. In one example, the angular extent Δθ can be between 85° and 95°.

Figure 3:
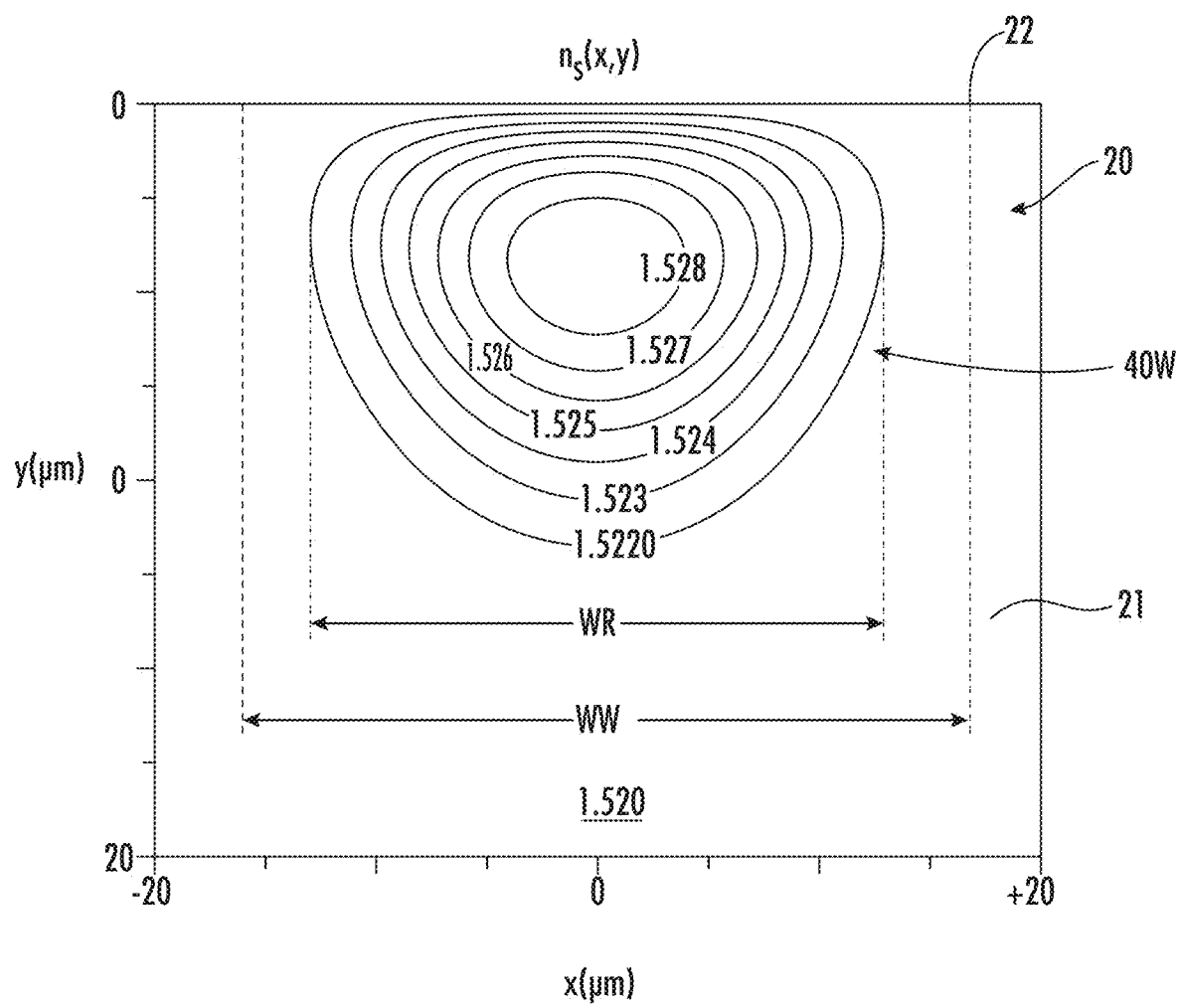
FIG. 3 is a cross-sectional view in the local (x,y) coordinates of an example waveguide IOX region for a straight portion of a channel waveguide as formed in the matrix of the glass-based substrate, with the straight-portion having a refractive index profile $n_S(x,y)$ as shown by the refractive index contours.

FIG. 3 is a cross-sectional view in the local (x,y) coordinates of an example waveguide IOX region 40W for one of the straight sections 70 of the waveguide 30 as formed in the matrix 21 of the glass-based substrate 20. The corresponding refractive index profile $n_S(x,y)$ of the waveguide IOX region 40W is shown by the refractive index contours. The waveguide IOX region 40W and the immediately surrounding portion of the matrix 21 (which can be considered the cladding) define the waveguide 30, wherein $n_0$ can be taken as the cladding index $n_c$ for the waveguide. The waveguide 30 has a width WW that is slightly larger than the width WR of the waveguide IOX region 40W, i.e., it includes the cladding defined by the immediately surrounding portion of matrix 21.

The example waveguide IOX region 40W of FIG. 3 is symmetrical about the line x=0 and has a maximum refractive index $n_1=1.528$. The matrix 21 has a bulk refractive index $n_0=1.520$, so that the refractive index contrast dn=1.528−1.520=0.006. In other examples, the index contrast dn can be in the range from about 0.004 to about 0.006. The refractive index increment δn between contour lines is $\delta n=4.3\times10^{-4}$. The refractive index profile $n_S(x,y)$ of the example waveguide IOX region 40W of FIG. 3 makes the waveguide 30 single mode at an operating wavelength λ, which in an example is a telecommunications wavelength of 800 nm or 1330 or 1550 nm. Other ranges or values may be possible using the concepts disclosed.

The waveguide bend loss at a given bend section 60 depends primarily on the mismatch between the waveguide modes in the straight sections 70 and the adjacent bend section 60 of the waveguide 30, and the radiative (leaky) nature of the modes supported in the bend section. The bend section 60 in the waveguide 30 can be modeled as a straight waveguide that has an equivalent refractive index profile $n_E$ given by:

$$n_E(x,y)=n_S(x,y)\cdot[1+x/RB]\approx n_S(x,y)+n_c\cdot x/RB$$

where $n_S(x,y)$ is the refractive index profile of the straight section 70 of the waveguide 30 under consideration, $n_c$ is the cladding refractive index and can be taken as the bulk refractive index $n_0$. The bend radius is RB, while x is the local lateral coordinate and y is the local depth coordinate. The equivalent index profile $n_E(x,y)$ is taken as constant in the local z-direction over the bend section 60. This equivalent index profile $n_E(x,y)$ has an inherent bend loss associated with the extra term $n_c\cdot x/RB$. Note that as the bend radius RB becomes larger, the bend loss term becomes smaller, and in the limit as RB becomes infinitely large, the bend section becomes straight and the bend loss term goes to zero. The term "equivalent refractive index profile" is used instead of the term "effective refractive index profile" to avoid confusion with the concept of effective refractive index used to describe properties of guided modes with respect to their propagation constants.

A conventional channel waveguide has the same refractive index profile $n(x,y)=n_S(x,y)$ in its straight sections as well as in its bends 60. An aspect of the disclosure is to modify the refractive index profile n(x,y) in the bend section 60 so that the bend loss of the waveguide 30 at the bend section is reduced or eliminated.

To this end, the waveguide IOX region 40W is modified at the bend section 60 from $n_S(x,y)$ to $n_C(x,y)=n(x,y)+\Delta n(x)$, where Δn(x) is a corrective refractive index term ideally defined by $\Delta n(x)=Gx$, where $G=-n_c/R$, where G is a refractive index gradient. The refractive index profile $n_c$ is referred to hereinafter as the compensated refractive index profile, and the modified waveguide IOX region 40W at the bend section 60 becomes a compensated bend IOX region 40C the defined a compensated bend section 60C, as introduced and explained in greater detail below.

The corrective refractive index term Δn(x) is applied over the IOX region 40W at the bend section 60 to effect the transformation to the compensated bend IOX region 40C. The example IOX region 40W of FIG. 3 resides within a lateral range defined by x=−20 μm to x=+20 μm. Since the corrective refractive index term Δn(x) is subtractive, Δn(−20 μm)=0 (minimum) while $\Delta n(+20~\mu m)=\Delta n_{max}$ (i.e., is maximum) while varying linearly between these two extreme values. Thus, in examples, the corrective refractive index term Δn(x) can be expressed in terms of a shifted coordinate n(x') where x'=x−Δx, where in the present example Δx=−20 μm.

Table 1 below shows example values of $\Delta n_{max}$ ($\times 10^{-3}$) for different bend radii RB of 3, 5, 7, 9, 11 and 13 mm and for $n_0=n_c=1.5$.

TABLE 1

| | RB (min) | | | | | |
|---|---|---|---|---|---|---|
| | 3 | 5 | 7 | 9 | 11 | 13 |
| $\Delta n_{max} \times 10^{-3}$ | 20.0 | 12.0 | 8.6 | 6.7 | 5.5 | 4.6 |

Figure 4:
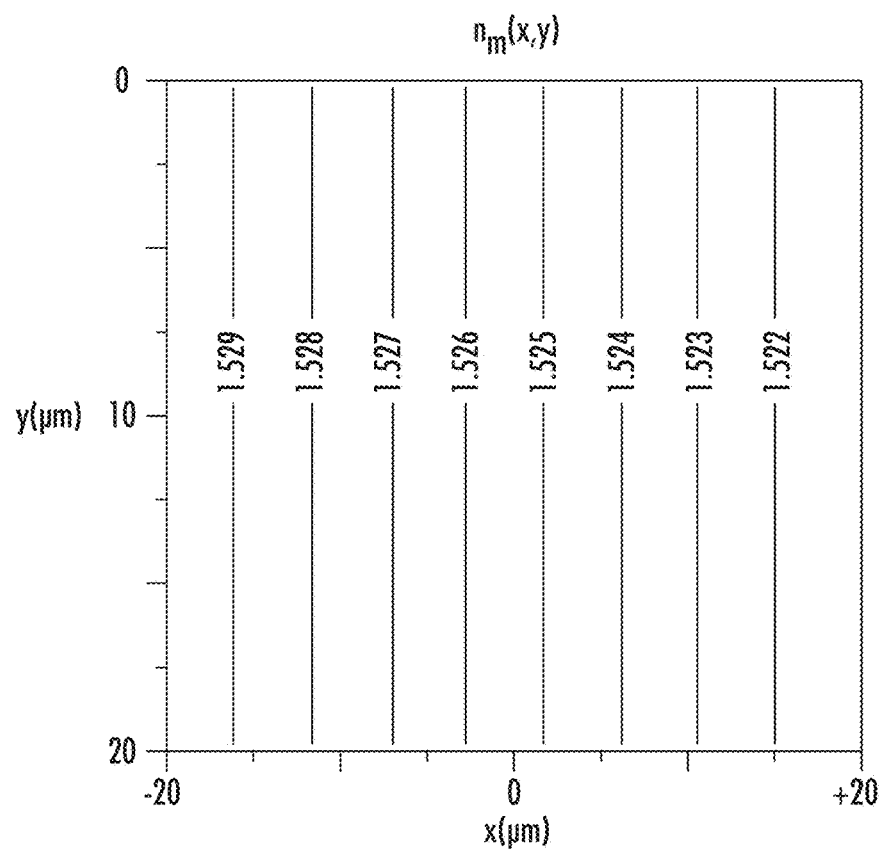
FIG. 4 is similar to FIG. 3 and shows an example of a linear modifying IOX region with a linear modifying refractive index profile $n_M(x,y)$.

FIG. 4 is similar to FIG. 3 and shows an example of an ideal linear modifying IOX region 40M with a linear modifying refractive index profile $n_M(x,y)$ that can be used to define the corrective refractive index term Δn(x').

Figure 5:
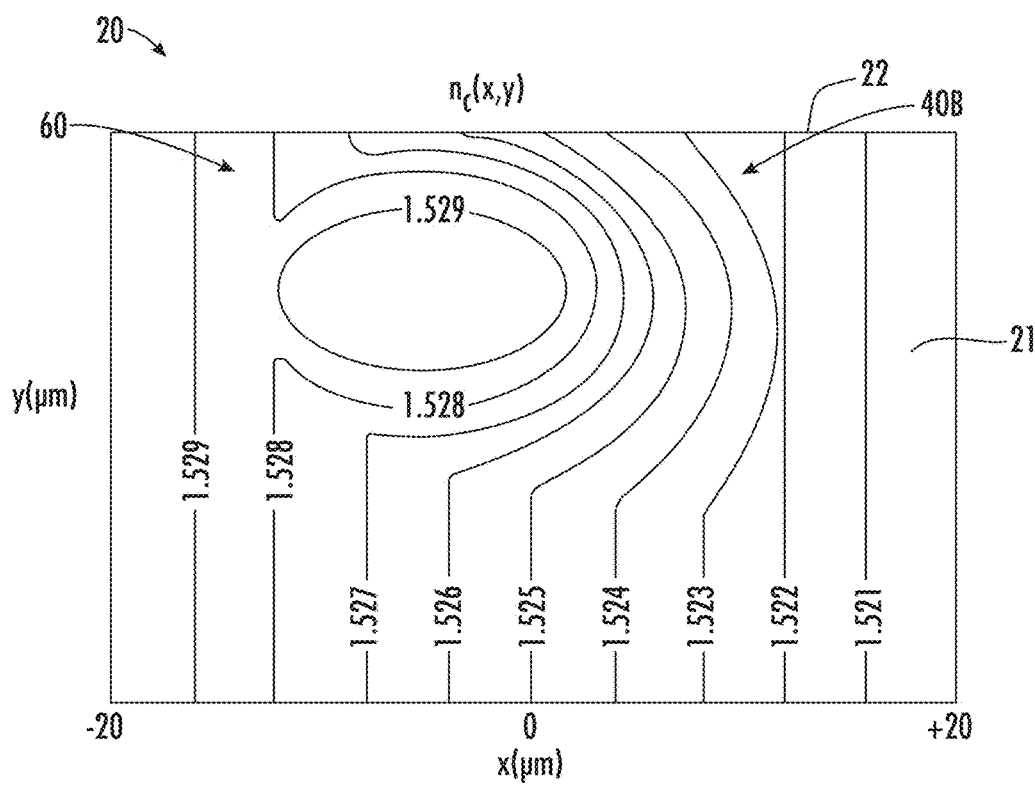
FIG. 5 is a plot based on a computer-simulation that combines a linear modifying IOX region such as shown in FIG. 4 with a waveguide IOX region for a straight portion of a channel waveguide such as shown in FIG. 3 to arrive at compensated cross-sectional refractive index profile $n_C(x,y)$ for the bend section of the waveguide.

FIG. 5 is a plot based on a computer-simulation that combines a linear modifying IOX region 40M such as shown in FIG. 4 with a waveguide IOX region 40W for a straight portion of a channel waveguide such as shown in FIG. 3 to arrive at compensated cross-sectional refractive index profile $n_C(x,y)=n(x,y)+\Delta n(x)$ for the bend section 60 of the waveguide 30. The compensated refractive index profile $n_c(x,y)$ is defined at each (x,y) cross-section at each z position along the (curved) centerline CLW of the bend section 60, as further explained below in connection with FIGS. 7C, 7D and 7E.

The corrective refractive index term Δn(x) is ideally $\Delta n(x)=Gx$ where $G=-n_c/RB$. In practice, the corrective refractive index term Δn(x) will be quasi-linear and only an approximation of the idealized linear expression. Fortunately, even a quasi-linear approximation for Δn(x) is sufficient to reduce bend loss in bend section 60 as compared to the case where Δn(x)=0, i.e., having no corrective refractive index term. Accordingly, the compensated refractive index profile $n_C(x,y)$ can be expressed as:

$$n_C(x,y) = n(x,y) + \Delta n_q(x,y)$$

where $\Delta n_q(x,y)$ is a quasi-linear corrective refractive index term that is at least an approximation to the idealized corrective refractive index term $\Delta n(x)$.

Forming the Compensated Refractive Index Profile

It is known in the art that a two-step IOX process involving first and second different in-diffusing ions (ion I1 and ion I2) with different diffusivities $D_1$ and $D_2$ (where $D_1 < D_2$) can create in the glass-based substrate 20 two overlapping IOX regions. Furthermore, the overlapping IOX regions end up creating a new (third) IOX region with a refractive index profile $n_3(x,y,z)$ that is substantially the sum of the refractive index profiles of the two separate IOX regions. Said differently, two overlapping IOX regions IOX1 and IOX2 can be thought of as being superimposed, with their respective refractive index profiles $n_1(x,y,z)$ and $n_2(x,y,z)$ also being superimposed so that the resulting refractive index profile $n_3(x,y,z) \approx n_1(x,y,z) + n_2(x,y,z)$, where minor differences can occur due to non-linear diffusion effects.

In an example, the glass-based substrate 20 can be an aluminosilicate glass or a borosilicate glass containing sodium (e.g., $Na_2O$) in a sufficient amount for conducting an IOX process using $Na^+$ as the out-diffusing native ion from the matrix 21. In another example, the glass-based substrate 20 can be an aluminosilicate glass or a borosilicate glass containing lithium (e.g., $Li_2O$) in a sufficient amount for conducting an IOX process using $Li^+$ as the out-diffusing native ion from the matrix 21.

Forming the compensated refractive index profile $n_c(x,y)$ from the original or base refractive index profile $n_S(x,y)$ requires modifying the waveguide IOX region 40W at the given bend section 60. In an example, this can be accomplished by performing a modifying IOX process having a modifying refractive index profile $n_M(x,y)$, which introduces the required refractive index gradient $G = -n_c/R$ (or an approximation thereto) on top of the original waveguide refractive index profile $n_S(x,y)$. The modifying IOX process can be performed first, followed by the waveguide IOX process that forms the waveguide IOX region 40W having the waveguide refractive index profile $n_S(x,y)$ to arrive at the compensated refractive index profile $n_C(x,y)$ for the bend section 60.

Figure 6A:
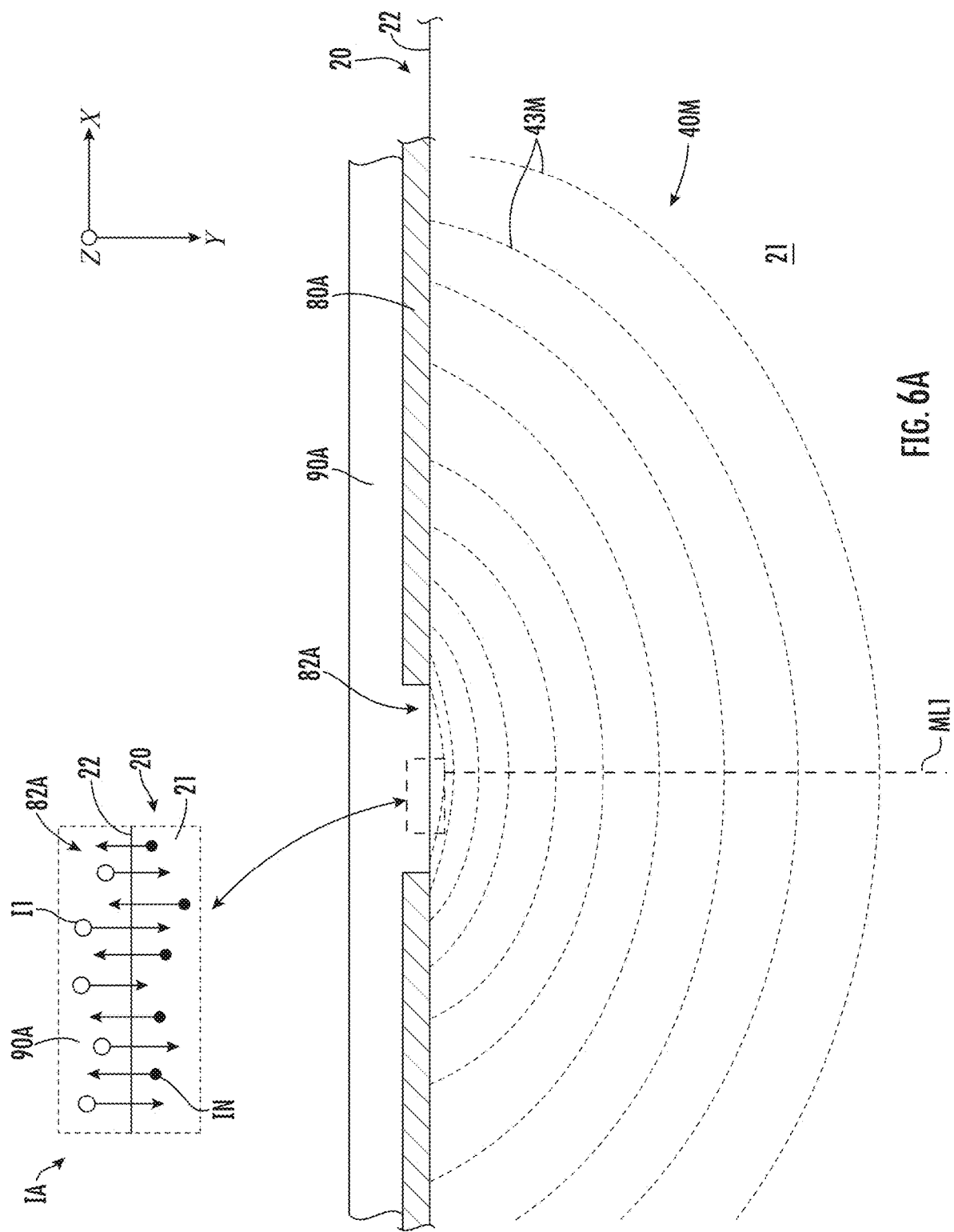
FIG. 6A is an (x,y) cross-sectional view of an example modifying IOX process that forms a quasi-linear modifying IOX region in the matrix of the glass-based substrate.

FIG. 6A is an (x,y) cross-sectional view of an example modifying IOX process that forms a quasi-linear modifying IOX region 40M in the matrix 21 of the glass-based substrate. The modifying IOX region 40M has a mid-line ML1 and a modifying refractive index profile $n_M(x,y)$ in the global Cartesian coordinates and $n_M(x,y)$ in the local Cartesian coordinates of the waveguide 30 (yet to be formed in the example shown).

The first IOX process is shown in the close-up inset IA. The modifying IOX process is carried using a first IOX medium 90A having first ions I1 as the replacement or in-diffused ions. In an example, the first IOX medium 90A comprises a salt bath, such as a $KNO_3$ salt bath, wherein the first ions I1 are $K^+$ ions. The native or out-diffusing ions are denoted IN, and in an example can be Na+ or Li+, depending on the composition of the glass-based substrate 20, as noted above.

Figure 6B:
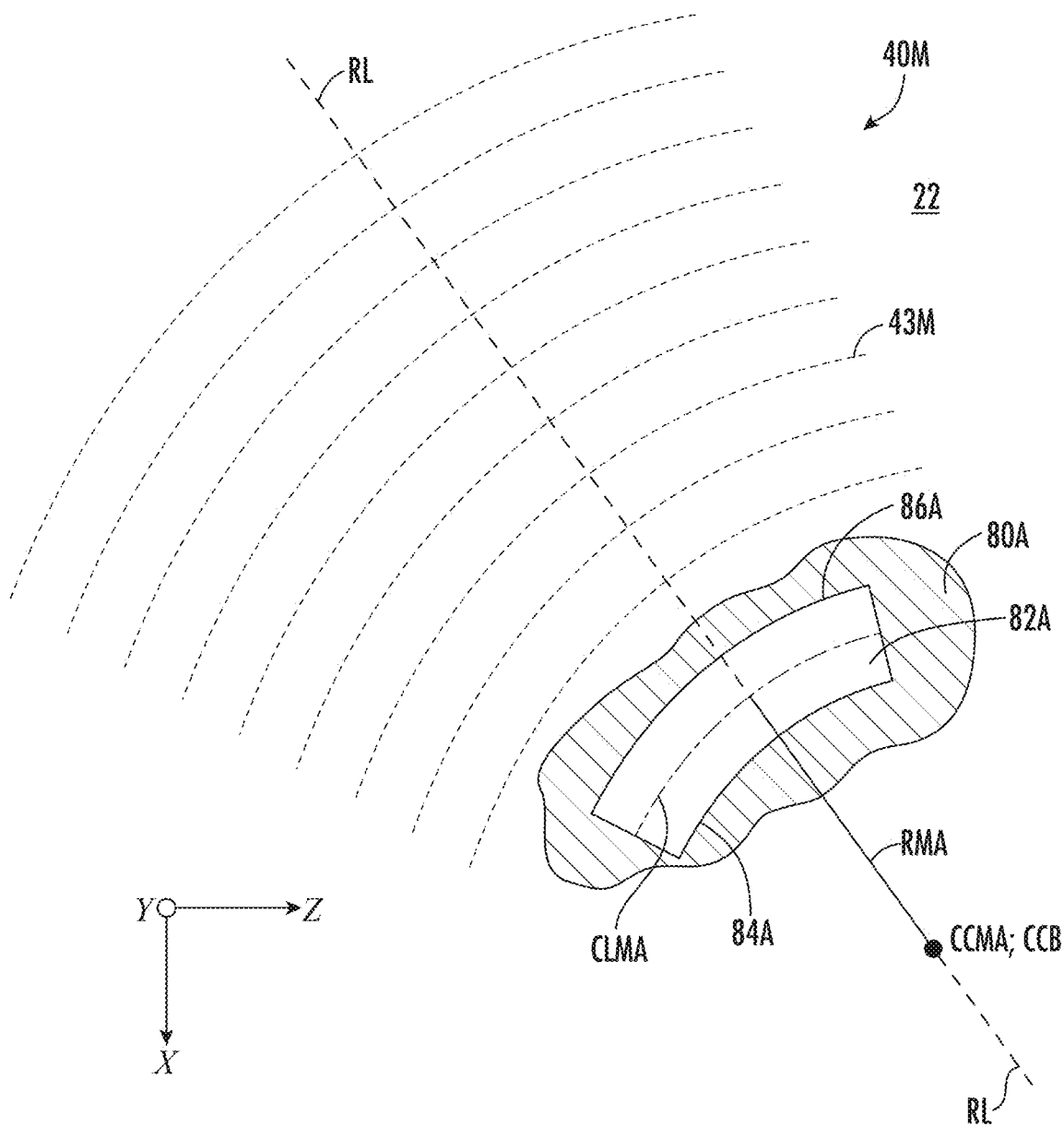
FIG. 6B is a top-down view of a first mask and the refractive index contours of the modifying IOX region formed using the modifying IOX process of FIG. 6A.

The first IOX process employs a first mask 80A disposed on the top surface 22 of the glass-based substrate 20. The first mask 80A has a first mask opening 82A. FIG. 6B is a top-down view of the first mask 80A and an example first opening 82A, which is arcuate or bend shaped. The first mask opening 82A defines the location and shape (i.e., distribution or profile) of the modified IOX region 40M. The first mask opening 82A has an inside edge (or concave side) 84A and an outside edge (or convex side) 86A, and center of curvature RM measured from a center of curvature CCM to a centerline CLM. The modifying refractive index profile $n_M(x,y)$ of the modifying IOX region 40M can be controlled by the main parameters of the first IOX process, which include temperature, time, concentration of the first ion I1, as well as by the size and shape of the first mask opening 82A. A reference line RL that runs through the center of curvature CCM and through the center of the first mask opening 82A is shown in FIG. 6B. In an example, the mask center of curvature CCM is coincident with the bend center of curvature CCB.

The modifying refractive index profile $n_M(x,y)$ of the modifying IOX region 40M becomes increasingly linear with distance from its origin $(x_M, y_M)$, which can be taken as the (x,y) location of its maximum refractive index mM and which can be located at or near the top surface 22 of the glass-based substrate 20. The modifying refractive index profile $n_M(x, y, z)$ in the global (x, y, z) Cartesian coordinates of the glass-based substrate 20 has curved refractive index contours 43M that on the convex side 86A of the waveguide IOX region 40W expand outward and become farther apart with distance. The local quasi-linear modifying refractive index profile $n_M(x,y)$ where the compensated bend section 60C resides (or is to reside) is of main interest.

Figure 7:
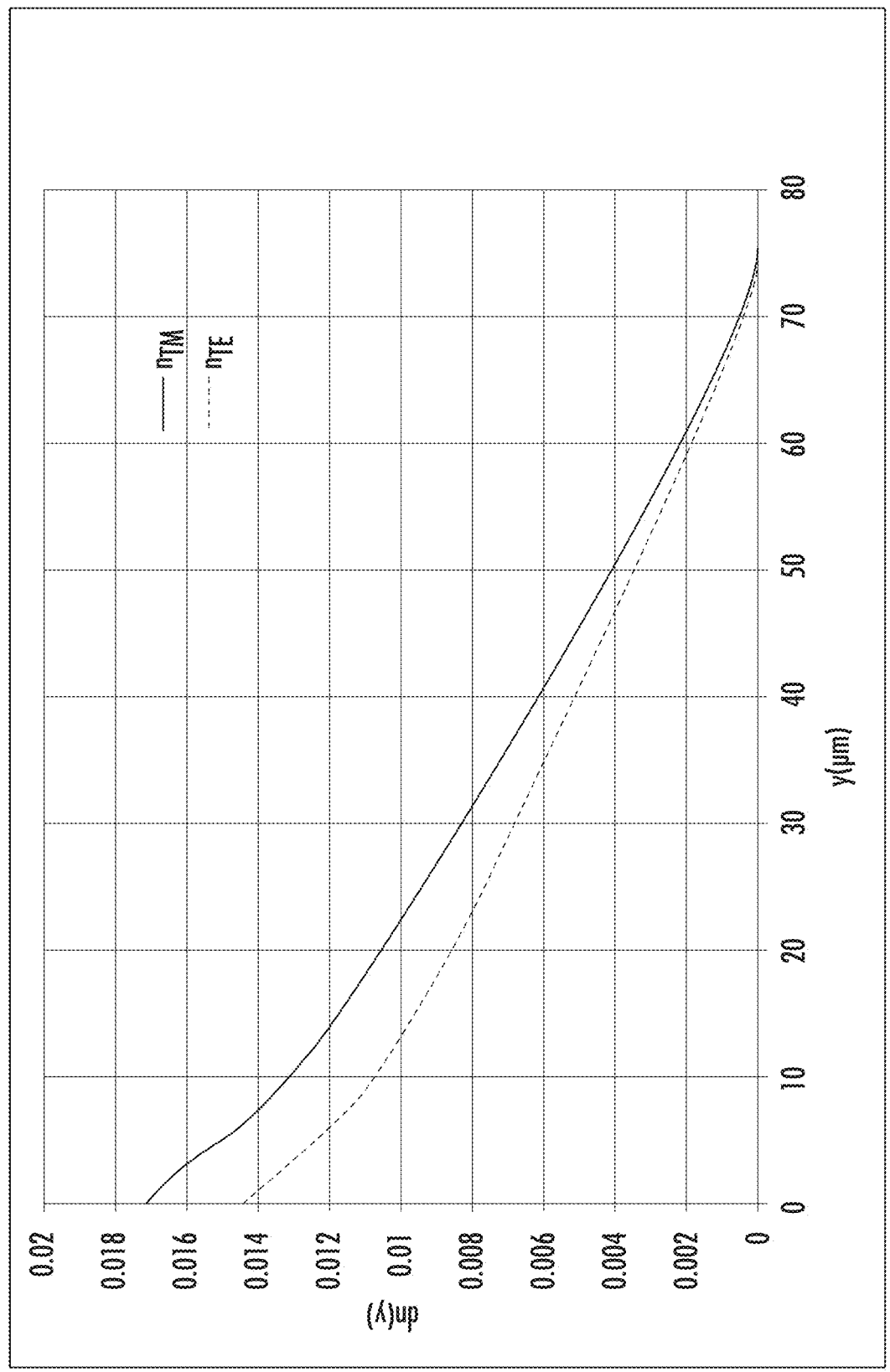
FIG. 7 is a plot of the refractive index contrast dn(y) versus distance y (μm) into the glass-based substrate for both transverse electric (TE) and tranverse magnetic (TM) polarizations for an example $K^+$—$Na^+$ IOX process carried out in an aluminosilicate substrate using a $KNO_3$ salt bath at a temperature of 380° C. for a diffusion time of few hours.

FIG. 7 is a plot of the refractive index contrast dn(y) versus distance y (μm) into the glass-based substrate for an example blanket $K^+$—$Na^+$ IOX process carried out through the top surface 22 of an aluminosilicate substrate 20 using as the IOX medium 90A a $KNO_3$ salt bath (i.e., K concentration of 100%/o) at a temperature of 380° C. for a diffusion time for a few hours. The plot shows the results for the transverse electric (TE) and transverse magnetic (TM) modes. The $K^+$—$Na^+$ IOX process produced a refractive index contrast $dn_{TE}$ of 0.014 for TE mode and $dn_{TM}$ of 0.017 for the TM mode. The profile of the refractive index contrast dn(y) is relatively linear for y>10 μm.

Figure 8A:
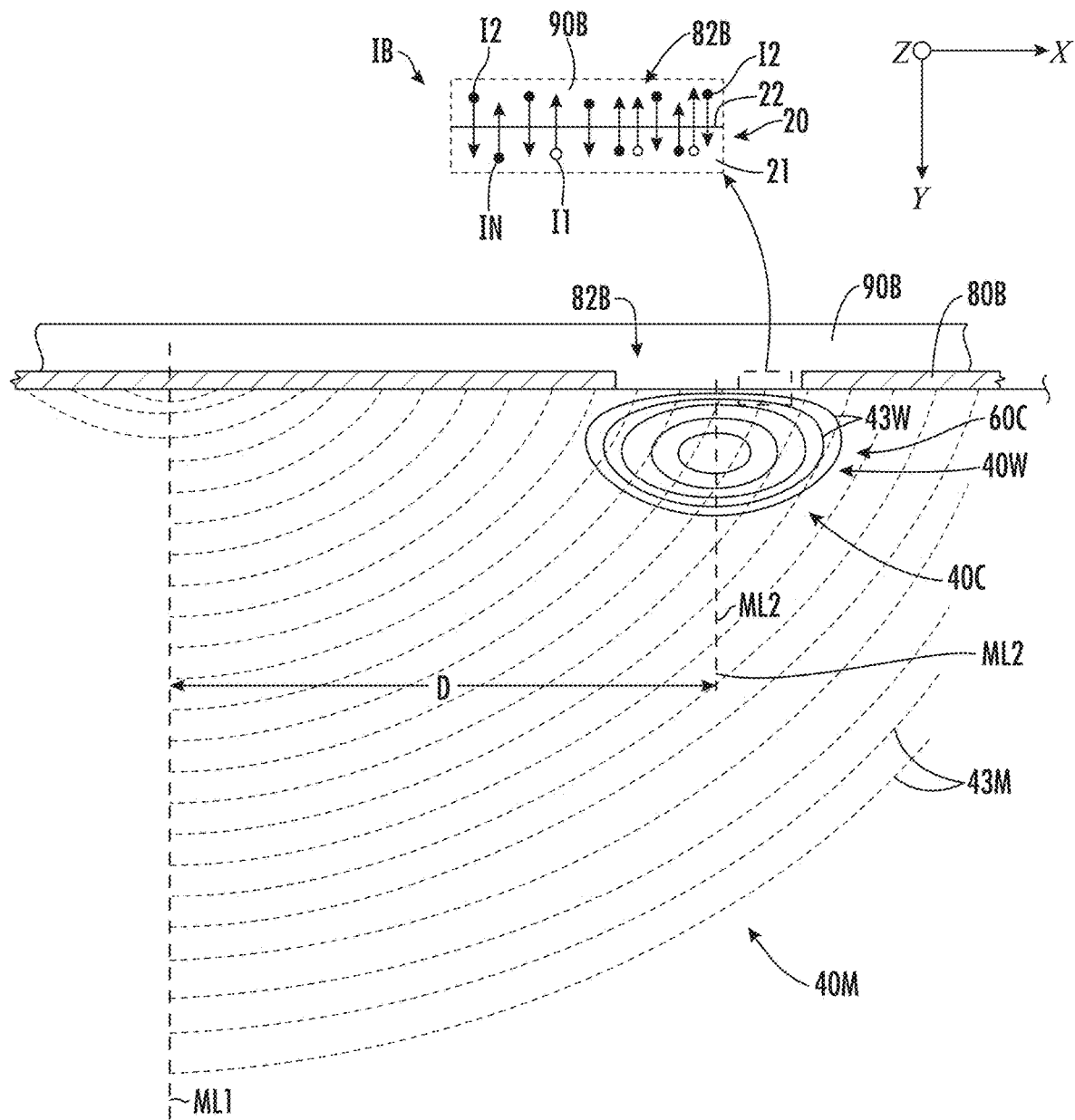
FIG. 8A is similar to FIG. 6A and is an (x,y) cross-sectional view of an example second IOX process that forms a waveguide bend in the quasi-linear modifying IOX region, with the modifying IOX refractive index contours superimposed with the waveguide IOX refractive index contours.
Figure 8B:
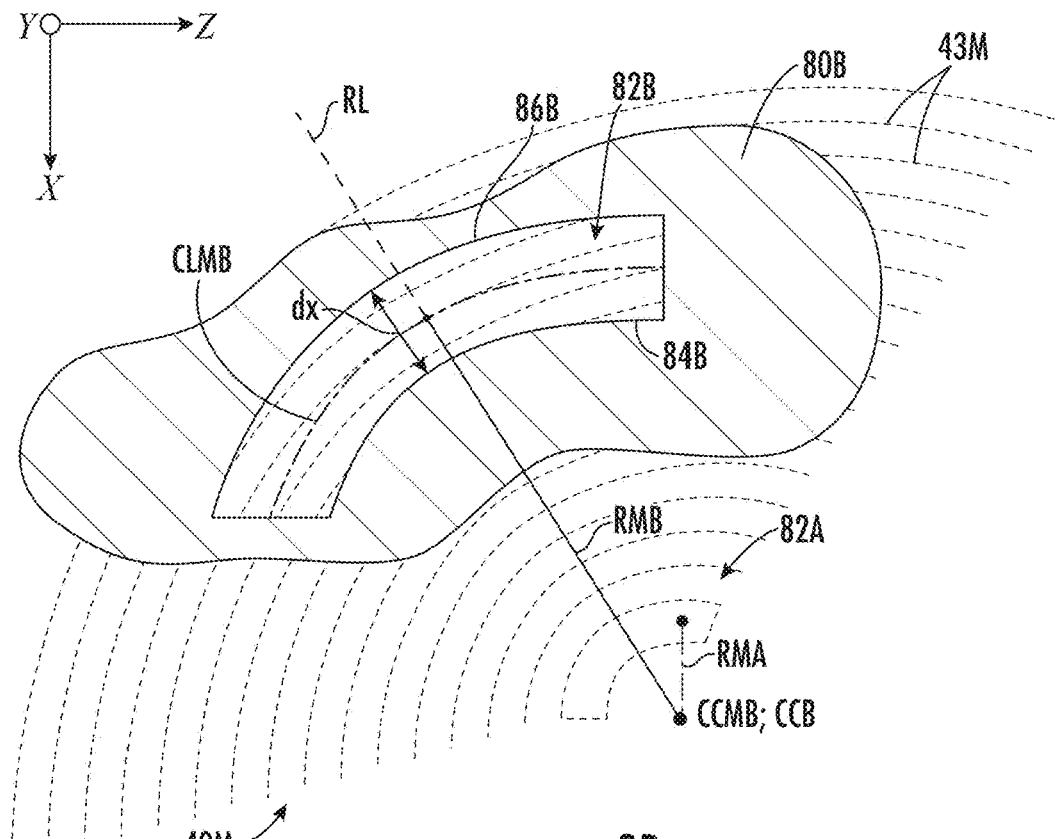
FIG. 8B is a top-down view of the refractive index contours of the quasi-linear modifying IOX and the second mask used to form the waveguide bend section using the second IOX process, with the location of the first mask aperture shown for reference (dashed outline).

FIG. 8A is similar to FIG. 6A is an (x,y) cross-sectional view of an example second IOX process that forms a compensated waveguide bend section 60C in the quasi-linear modifying IOX region 40M using a second mask 80B having a second mask opening 82B. The modifying IOX refractive index contours 43M are shown superimposed with the waveguide IOX refractive index contours 43W. FIG. 8B is a top-down view of the refractive index contours 43M of the quasi-linear modifying IOX region 40M and the second mask 80B used to form the compensated waveguide bend section 60C using the second IOX process. The location of the first mask opening 82A shown for reference (dashed outline). The distance between the first and second mask openings 82A and 82B is D (see FIG. 8A).

The second IOX process uses a second IOX medium 90B that contributes a second replacement or in-diffusing ion I2. An example second ion I2 is silver ($Ag^+$), which has a much higher diffusivity then potassium at the same diffusion temperature. The second IOX process is shown in the close-up inset IB and shows the second ion I2 exchanging for both the first ion I1 as $K^+$ and the native ion IN as $Na^+$ or $Li^+$.

The second mask opening 82B also has an arcuate or bend shape with a concave side 84B and a convex side 86B, and radius of curvature RW as measured relative to a centerline CLW. In an example, the second mask opening 82B is substantially concentric with the first mask opening 82A, i.e., the two mask openings have substantially the same center of curvature CCM.

The modifying IOX region 40M remains substantially unaffected by the second IOX process remote from where the second IOX process takes place, i.e., where the modifying and waveguide IOX regions 40M and 20W do not overlap. This is especially the case when the second IOX process is carried out at a second diffusion temperature substantially less than the first diffusion temperature. In an example, the first diffusion temperature is 380° C. while the second diffusion temperature is 350° C. In any event, it is the quasi-linear portion of the modifying IOX region 40M that is of main interest.

The second IOX process is carried out through the second mask opening 82B in a manner to form the (bended) waveguide IOX region 40W similar to that of FIG. 3 and which in an example defines a single mode waveguide 30. However, the (bended) waveguide IOX region 40W is now superimposed on the quasi-linear modifying IOX region 40M, for which the modifying refractive index profile $n_M(x, y)$ serves as the corrective refractive index term $\Delta n_q(x,y)$. In an example, The quasi-linear modifying IOX region 40M has a mid-line ML2 and a refractive index contrast dn(x) over the width of the second mask opening 82B. In an example based on experiments, the refractive index contrast dn(x)=1.488−1.481=0.006. For second mask opening 82B having a width in the x-direction of dx, the refractive index gradient G across the second mask opening at each local (x,y) plane is given by G=dn(x)/dx. For a width dx=10 μm, in an example G=0.006/10 μm=0.0006/μm. The result is the compensated bend section 60C.

With reference again to Table 1 above, an index contrast dn=0.006 allows for a bend radius RB for the compensated bend section 60C as small as about 10 mm. As noted above, the quasi-linear modifying IOX region 40M representing the corrective refractive index term $\Delta n(x)$ can be adjusted by adjusting at least one of the first (modifying) IOX process, the second (waveguide-forming) IOX process, and a distance D between the mid-lines ML1 and ML2 of the modifying IOX region 40M and the waveguide IOX region 40W, respectively. In an example, the distance D can be between 20 μm and 60 μm.

Figure 8C:
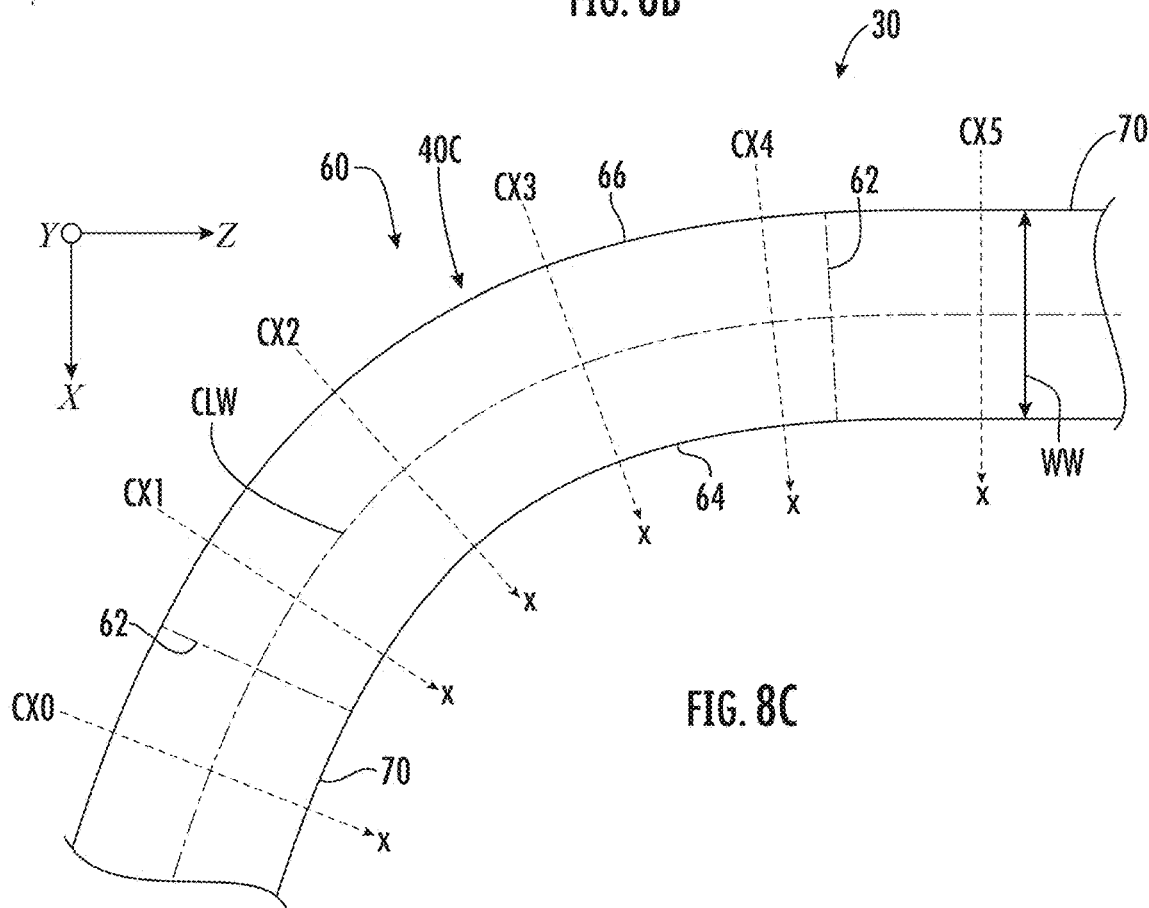
FIG. 8C is similar to FIG. 2 and is top-down view of a section of the channel waveguide after forming the compensated bend section and showing the refractive index profiles at six local (x,y) cross-sectional planes CX0 through CX5.
Figure 8D:
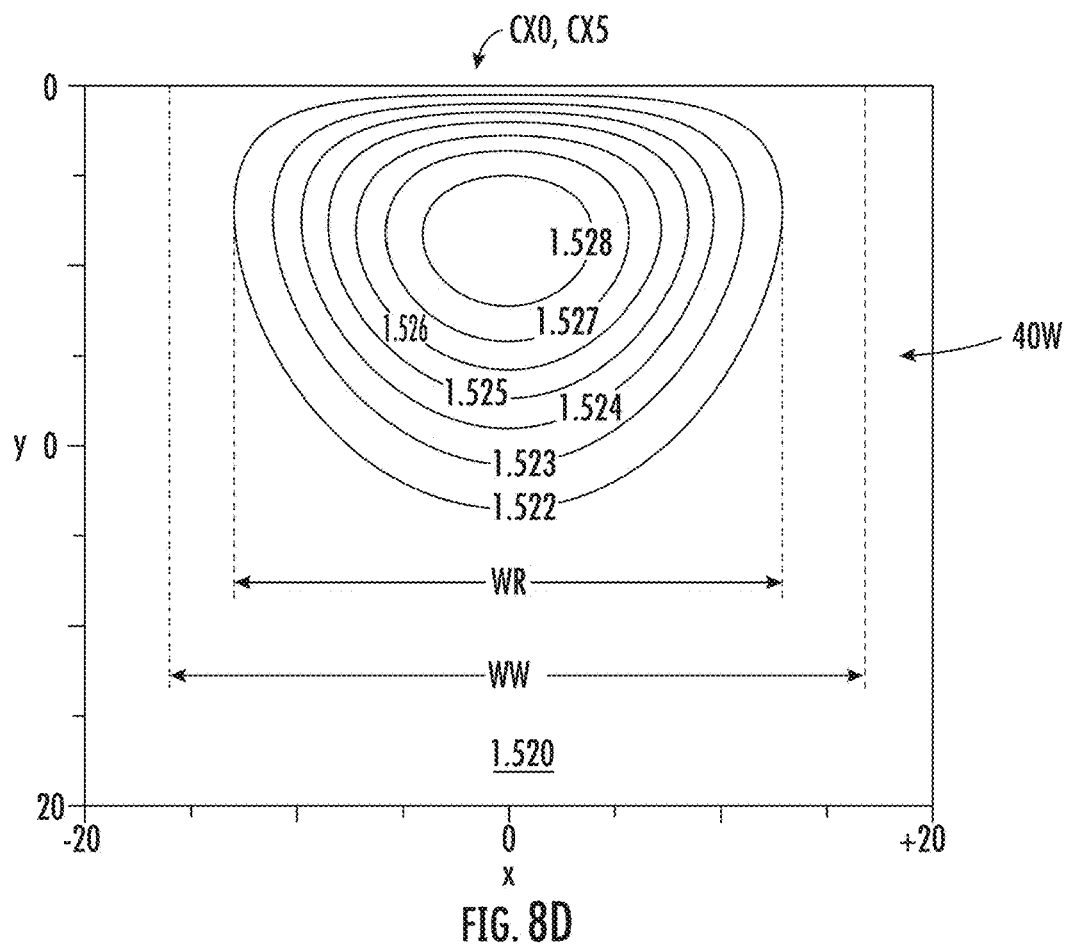
FIG. 8D shows the local straight cross-sectional refractive index profile for the cross-sectional planes CX0 and CX5 taken in the straight portions of the channel waveguide.
Figure 8E:
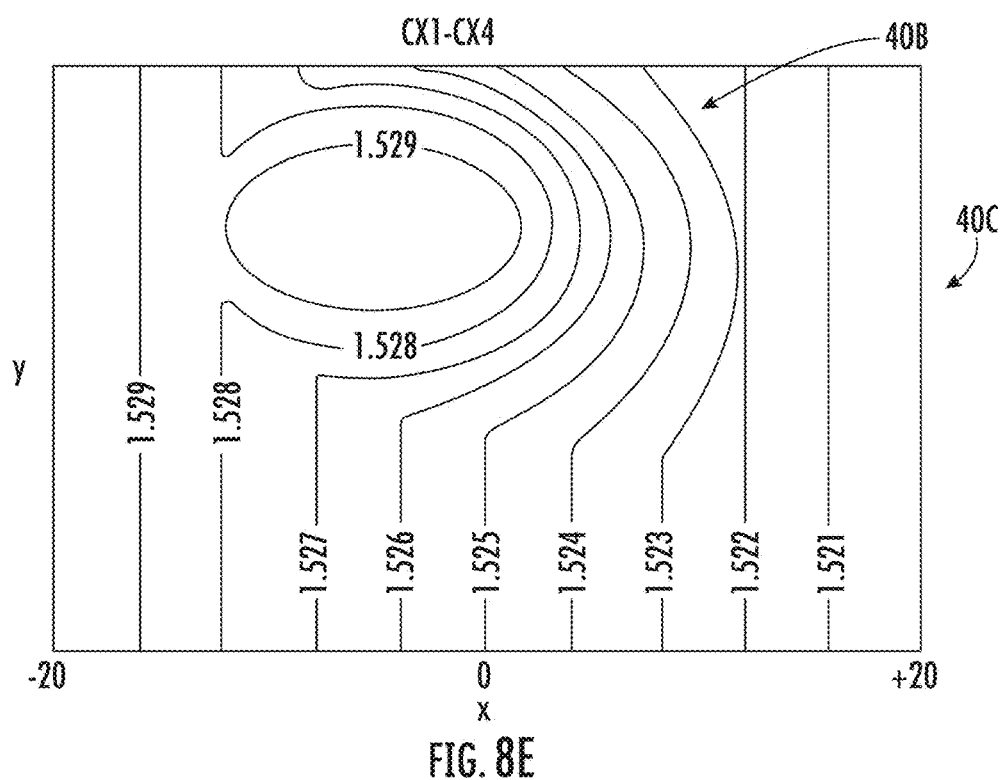
FIG. 8E shows the local compensated cross-sectional refractive index profile $n_C(x,y)$ for the cross-sectional planes CX1 through CX4 taken in the compensated bend section of the channel waveguide.

FIG. 8C is similar to FIG. 2 and is top-down view of a section of the channel waveguide 30 after forming the compensated bend section 60C and showing the refractive index profiles at six local (x,y) cross-sectional planes CX0 through CX5. FIG. 8D shows the local straight cross-sectional refractive index profile for the cross-sectional planes CX0 and CX5 taken in the straight portions of the channel waveguide. FIG. 8E shows the local compensated cross-sectional refractive index profile $n_C(x,y)$ for the cross-sectional planes CX1 through CX4 taken in the compensated bend section 60 of the waveguide 30.

As can be seen from FIGS. 7C, 7D and 7E, the resulting compensated refractive index profile $n_C(x,y)$ of the compensated bend IOX region 40C of the compensated bend section 60C is defined by the superposition of the quasi-linear modifying IOX region 40M and the otherwise "straight" waveguide IOX region 40W. The actual straight sections 70 of the waveguide 30 remain substantially unaffected, and in one example there is with a gradual (e.g., adiabatic) transition occurring at the respective ends 62 of the compensated bend section 60C.

Figure 9A:
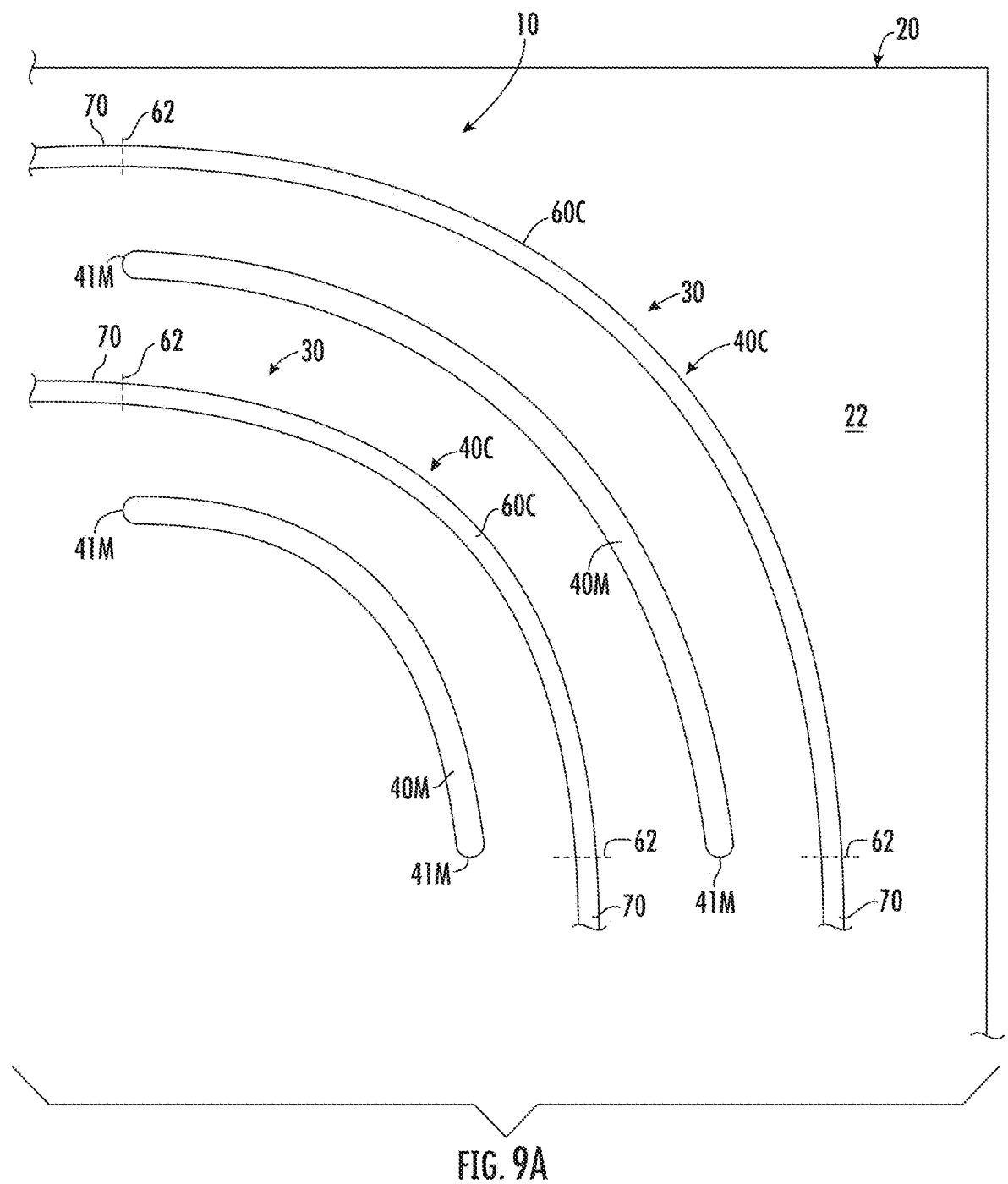
FIG. 9A is a top-down view of an example PLC formed in a glass-based substrate and showing an example of two different channel waveguides each having compensated bend section, and also showing the corresponding modifying IOX regions that run adjacent and parallel to the corresponding bend sections of the channel waveguides to define the compensated bend IOX region for each of the compensated bend sections.

FIG. 9A is a top-down view of an example PLC 10 formed in the glass-based substrate 20 and showing an example of two different waveguides 30 each having compensated bend section 60C, and also showing the corresponding modifying IOX regions 40M that run adjacent and substantially parallel to the corresponding compensated bend sections 60C of the channel waveguides 30 to define the compensated bend IOX region 40C for each of the compensated bend sections. Each of the modifying IOX regions 40M has opposite ends 41M that in one example terminate substantially in line with the ends 62 of the compensated bend section 60C. In example, the overall length of the modifying IOX regions 40M can be made shorter so that the opposite ends 41M do not reach the location of the ends 62 of the compensated bend section 60C to provide a more gradual transition between the compensated bend section and the corresponding straight sections 70 of the given waveguide 30.

Figure 9B:
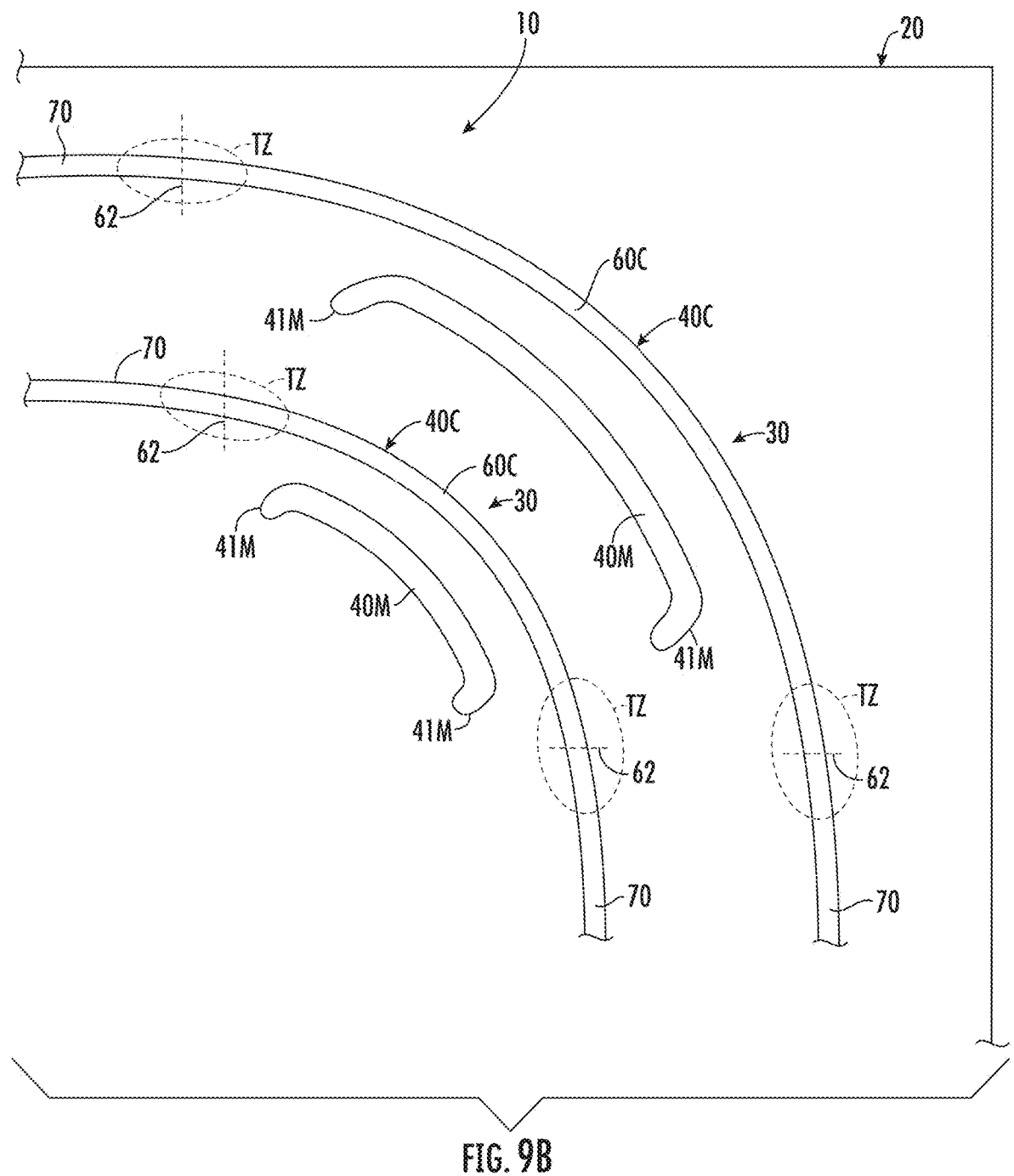
FIG. 9B is similar to FIG. 9A and shows an example configuration for the modifying IOX regions that provide an adiabatic transition between the compensated bend section and the adjacent straight portions of the channel waveguides.

FIG. 9B is similar to FIG. 9A and shows an example configuration for the modifying IOX regions 40M that can provide an adiabatic transition in a transition zone TZ between the compensated bend sections 60C and the straight portions 70 of the waveguides 30. The example configuration of the modifying IOX regions 40M has the opposite ends 41M curving away from its corresponding waveguide 30.

Figure 9C:
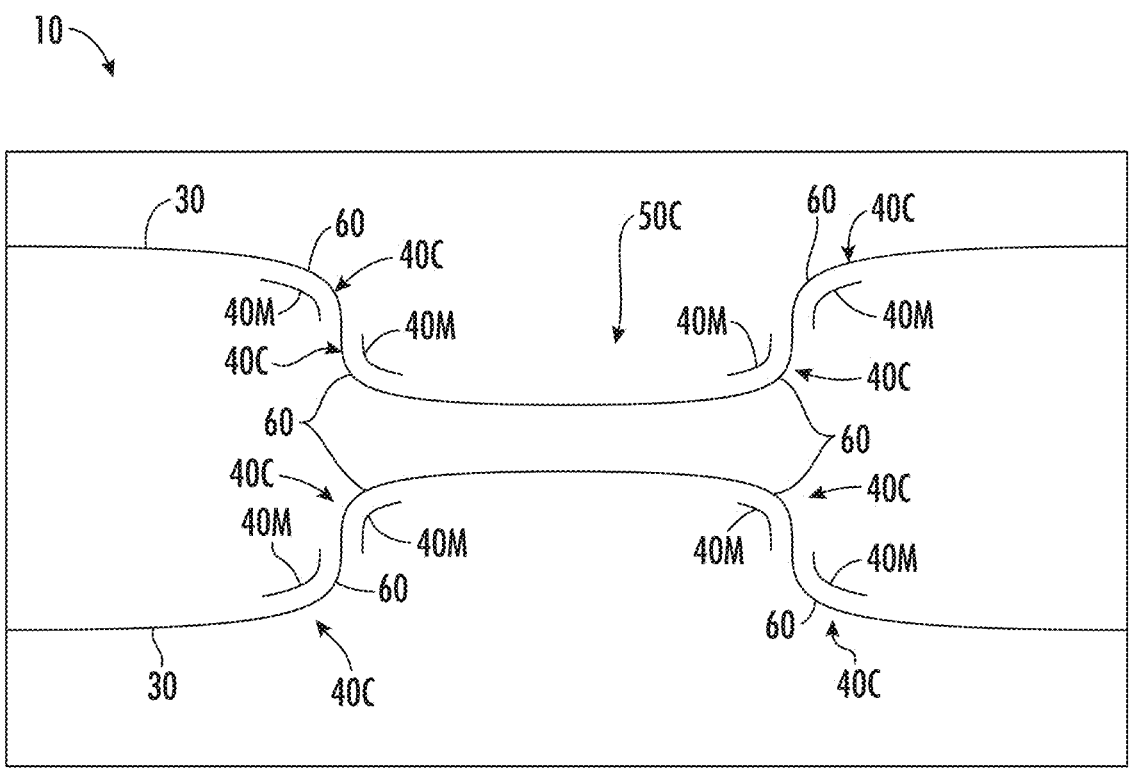
FIG. 9C is a top-down view of a portion of a PLC that includes a PLC device in the form of an optical coupler and showing example configurations modifying IOX regions used to form the compensated bend IOX regions that define the compensated bend sections of the channel waveguides.

FIG. 9C is a top-down view of a portion of a PLC 10 that includes a PLC device 50 in the form of an optical coupler 50C having two waveguides 30. FIG. 9C shows an example configuration for modifying IOX regions 40M to form compensated bend IOX regions 40C for the compensated bend sections 60C in the two waveguides 30.

Design Considerations

A consideration in applying the methods of forming the compensated bend sections 60C as disclosed herein is that the waveguide bend radius RB of the waveguide 30 is preferably much larger than the waveguide width WW. For most practical applications, the waveguide width WW<100 μm while the waveguide bend radius RB>1 mm, and usually in the range between 5 mm and 30 mm, so that RB>>WW. Further in the example, WW>5 μm, while in another example, WW>10 μm.

Another consideration involves ensuring that a given modifying IOX region 40M substantially only affects a corresponding bend section 60 of a select waveguide IOX region 40W of a select waveguide 30 and not other waveguides or the straight sections 70 of the waveguide. The potential issue of the modifying IOX region 40M adversely impacting other waveguides 30 or the straight sections 70 is readily avoided by computer simulations of the IOX processes used to form the modifying IOX regions 40M to provide a good estimate of their respective widths WR and locations so that they can be properly situated relative to the waveguide 30 to be compensated, as well as positioned sufficiently remote from any other modifying IOX regions 40M. Note that in the examples of FIG. 8B and FIGS. 9A, 9B and 9C, the modifying IOX regions 40M were shaped to follow the shape of the bend section 60 of the waveguide 30. This shaping was discussed above in connection with selectively forming the first and second mask openings 82A and 82B to have similar arcuate shapes.

In practice, the modifying IOX region 40M can have any shape that contributes to the linear corrective term of the compensated refractive index profile $n_C(x,y)$ so that the optical loss at the compensated bend section 60C is less than if the bend section was unmodified, i.e., had the same refractive index profile $n_S(x,y)$ as one of the straight sections 70 of the waveguide 30.

In various examples, the compensated bend sections 60C provide a reduction in optical loss of at least 5% or at least 10% or at least 15% or at least 20%. A greater reduction in the optical loss can be obtained the closer the quasi-linear modifying IOX region 40M is at providing the exact linear correction term discussed above.

Bend Loss Modeling

The sensitivity of the bend loss compensation to variations in the corrective refractive index term Δn(x) of the corrective refractive index profile $n_C(x,y)=n_S(x,y)+\Delta n_q(x,y)$ was evaluated by modeling the bend loss of a waveguide 30 having a bend section 60 with a constant bend radius RB and an angular extent Δθ, and an initial refractive index $n_S(x,y)$ as shown in FIG. 3 and with the idealized linear modifying refractive index profile $n_M(x,y)=n_M(x)$ as shown in FIG. 4.

Figure 10A:
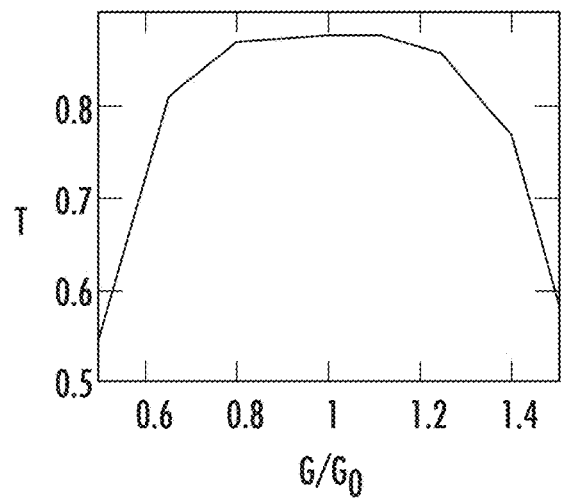
FIG. 10A is a plot of optical transmission T versus the ratio $G/G_0$, where $G_0 = n_0/R$ and $G = n_0/(RB \pm dRB)$ for a bend radius of RB=7.5 mm and for dRB in the range from 0 to (1.5)·RB.
Figure 10B:
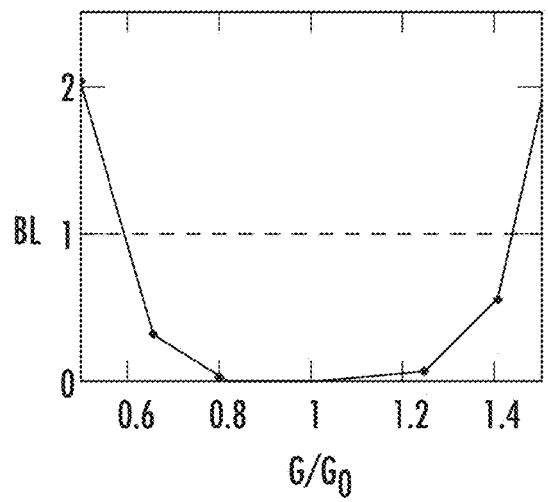
FIG. 10B is similar to FIG. 10A and plots the bend loss BL (dB) versus $G/G_0$.
Figure 11A:
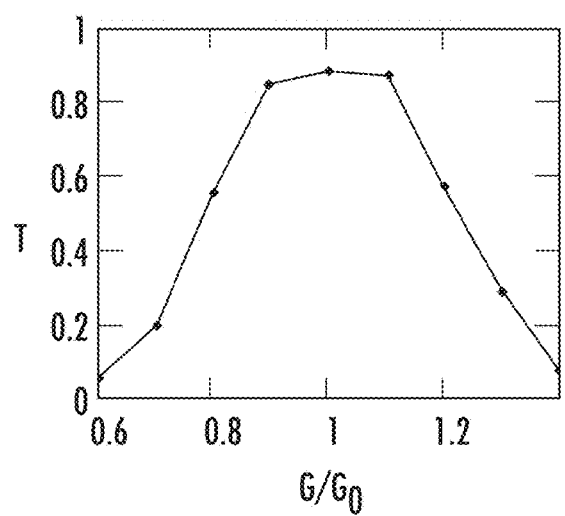
FIGS. 11A and 11B are the same as FIGS. 10A and 10B respectively, but for a bend radius RB=3.0 mm.
Figure 11B:
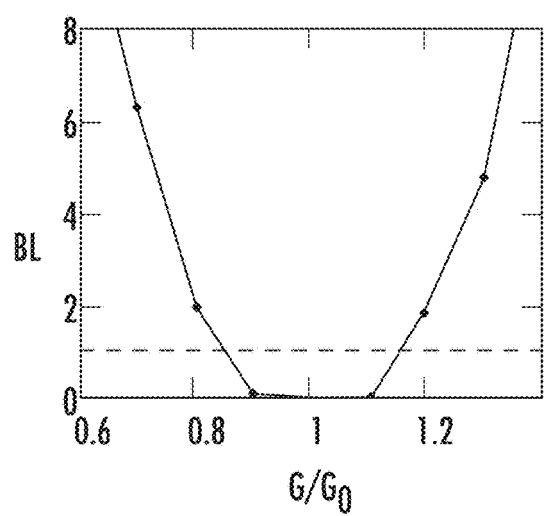

FIG. 10A is a plot of optical transmission T versus the ratio $G/G_0$, where $G_0$ is the index gradient=$n_0$/RB and G=$n_0$/(RB±δ) for a bend radius RW=7.5 mm and δ varying from 0 to (0.5)·RB. FIG. 10B is similar to FIG. 10A and plots the bend loss BL (dB) versus $G/G_0$. FIGS. 11A and 11B are the same as FIGS. 10A and 10B respectively, but for a waveguide bend radius RW=3.0 mm. The simulation results show that negligible loss is introduced due to approximately a +/−20/o variation in the index gradient G at RW=7.5 mm (+/−10% at RB=3 mm), which is a sufficiently high tolerance for practical applications and for present manufacturing capabilities.

Note that the variation in the index gradient G need not be a variation 5 in the waveguide radius R but can be a more general variation in G due to any number of factors, including the quasi-linear nature of the gradient G associated with variations in the modifying IOX process and/or the waveguide IOX process.

For the purposes of describing and defining the present teachings, it is noted that the terms "substantially" and "approximately" and "about" are utilized herein to represent the inherent degree of uncertainty that may be attributed to any quantitative comparison, value, measurement, or other representation. The terms "substantially" and "approximately" and "about" are also utilized herein to represent the degree by which a quantitative representation may vary from a stated reference without resulting in a change in the basic function of the subject matter at issue.

It is to be understood that variations and modifications can be made on the aforementioned embodiments without departing from the concepts of the present disclosure, and further it is to be understood that such concepts are intended to be covered by the following claims unless these claims by their language expressly state otherwise.

What is claimed is:

1. A method of forming a channel waveguide with a compensated bend section and a straight section comprising a straight-section refractive index cross-sectional profile, the method comprising:
   a) forming in a glass-based substrate a modifying ion-exchanged (IOX) region using a first IOX process that uses a mask comprising a mask opening that resides closest to a concave side of the compensated bend section;
   b) forming in the glass-based substrate a waveguide bend IOX region using a second IOX process designed to impart a straight-section cross-sectional refractive index profile in the absence of the modifying IOX region; and
   c) wherein the modifying IOX region and the waveguide bend IOX region combine to form a compensated waveguide bend IOX region that defines in the channel waveguide the compensated bend section, which has an amount of optical loss less than if the modifying IOX region were absent.

2. The method according to claim 1, further comprising performing act a) prior to act b).

3. The method according to claim 1, wherein the glass-based substrate comprises an aluminosilicate glass or a borosilicate glass containing sodium, and wherein the first IOX process comprises exchanging potassium ions ($K^+$) for first sodium ions ($Na^+$) in the glass-based substrate, and wherein the second IOX process comprises exchanging silver ions ($Ag^+$) for additional sodium ions ($Na^+$) in the glass-based substrate.

4. The method according to claim 1, wherein the glass-based substrate comprises an aluminosilicate glass or a borosilicate glass containing sodium, and wherein the first IOX process comprises exchanging potassium ions ($K^+$) for first lithium ions ($Li^+$) in the glass-based substrate, and wherein the second IOX process comprises exchanging silver ions ($Ag^+$) for additional lithium ions ($Li^+$) in the glass-based substrate.

5. The method according to claim 1, wherein:
   the mask opening has a first arcuate opening with a first radius of curvature;
   the second IOX process uses a second mask having a second arcuate opening with a second radius of curvature; and
   wherein the first and second arcuate openings have substantially the same center of curvature, and wherein the first radius of curvature is less than the second radius of curvature.

6. The method according to claim 1, wherein the compensated bend section has a concave side and a convex side, and wherein the modifying IOX region has a higher refractive index on the concave side than on the convex side.

7. The method according to claim 1, wherein the bend section has a bend radius RB>1 mm and a width WW<100 μm.

8. The method according to claim 7, wherein the bend radius RB is in the range 5 mm≤RB≤30 mm and the width WW>5 μm.

9. The method according to claim 1, wherein the modifying IOX region has a refractive index contrast in the range from about 0.004 to about 0.006 at the waveguide bend IOX region.

10. The method according to claim 1, wherein a transition between the compensated bend section and the straight waveguide section is adiabatic.

11. A channel waveguide formed by the process of claim 1.

12. A method of forming a channel waveguide with a compensated bend section and a straight section comprising a straight-section refractive index cross-sectional profile, the method comprising:
   a) forming in a glass-based substrate a modifying ion-exchanged (IOX) region using a first IOX process that uses a first mask having a first arcuate opening with a first radius of curvature;
   b) forming in the glass-based substrate a waveguide bend IOX region using a second IOX process that uses a second mask having a second arcuate opening with a second radius of curvature, the second IOX process designed to impart a straight-section cross-sectional refractive index profile in the absence of the modifying IOX region, wherein the first and second arcuate openings have substantially the same center of curvature, and the first radius of curvature is less than the second radius of curvature; and
   c) wherein the modifying IOX region and the waveguide bend IOX region combine to form a compensated waveguide bend IOX region that defines in the channel waveguide the compensated bend section, which has an amount of optical loss less than if the modifying IOX region were absent.

13. The method according to claim 1, wherein the glass-based substrate comprises an aluminosilicate glass or a borosilicate glass containing sodium, and wherein the first IOX process comprises exchanging potassium ions ($K^+$) for first sodium ions ($Na^+$) in the glass-based substrate, and wherein the second IOX process comprises exchanging silver ions ($Ag^+$) for additional sodium ions ($Na^+$) in the glass-based substrate.

14. The method according to claim 1, wherein the glass-based substrate comprises an aluminosilicate glass or a borosilicate glass containing sodium, and wherein the first IOX process comprises exchanging potassium ions ($K^+$) for first lithium ions ($Li^+$) in the glass-based substrate, and wherein the second IOX process comprises exchanging silver ions (Ag+) for additional lithium ions ($Li^+$) in the glass-based substrate.

15. The method according to claim 1, wherein the compensated bend section has a concave side and a convex side, and wherein the modifying IOX region has a higher refractive index on the concave side than on the convex side.

16. The method according to claim 1, wherein the first arcuate opening resides closest to the concave side of the compensated bend section.

17. The method according to claim 1, wherein the bend section has a bend radius RB>1 mm and a width WW<100 µm.

18. The method according to claim 7, wherein the bend radius RB is in the range 5 mm≤RB≤30 mm and the width WW>5 µm.

19. The method according to claim 1, wherein the modifying IOX region has a refractive index contrast in the range from about 0.004 to about 0.006 at the waveguide bend IOX region.

20. The method according to claim 1, wherein a transition between the compensated bend section and the straight waveguide section is adiabatic.

* * * * *

UNITED STATES PATENT AND TRADEMARK OFFICE
CERTIFICATE OF CORRECTION

Page 1 of 1

PATENT NO. : 10,585,242 B1
APPLICATION NO. : 16/145977
DATED : March 10, 2020
INVENTOR(S) : Lars Martin Otfried Brusberg et al.

It is certified that error appears in the above-identified patent and that said Letters Patent is hereby corrected as shown below:

On the Title Page

On page 2, in Column 1, item (56), Other Publications, Line 2, delete "Transistion" and insert -- Transition --, therefor.

On page 2, in Column 1, item (56), Other Publications, Line 10, delete "Exvhanged" and insert -- Exchanged --, therefor.

On page 2, in Column 1, item (56), Other Publications, Line 11, delete "Multimode;" and insert -- Multimode --, therefor.

On page 2, in Column 2, item (56), Other Publications, Line 7, delete "(2009." and insert -- 2009. --, therefor.

On page 2, in Column 2, item (56), Other Publications, Line 13, delete "Optic's" and insert -- Optics --, therefor.

On page 2, in Column 2, item (56), Other Publications, Line 43, delete "934-" and insert -- 984- --, therefor.

On page 2, in Column 2, item (56), Other Publications, Line 66, delete "Wavefuide-" and insert -- Waveguide- --, therefor.

On page 3, in Column 1, item (56), Other Publications, Line 3, delete "Internaitonal" and insert -- International --, therefor.

Signed and Sealed this
Twenty-sixth Day of May, 2020

Andrei Iancu
*Director of the United States Patent and Trademark Office*